United States Patent
Johnson et al.

(10) Patent No.: US 9,632,997 B1
(45) Date of Patent: Apr. 25, 2017

(54) INTELLIGENT CAPTION SYSTEMS AND METHODS

(71) Applicant: 3PLAY MEDIA, INC., Cambridge, MA (US)

(72) Inventors: Christopher E. Johnson, Belmont, MA (US); Christopher S. Antunes, Somerville, MA (US); Roger S. Zimmerman, Wellesley, MA (US); Jeremy E. Barron, Boston, MA (US); Joshua Miller, Charlestown, MA (US); Anatole Khesin, Somerville, MA (US)

(73) Assignee: 3Play Media, Inc., Boston, MA (US)

(*) Notice: Subject to any disclaimer, the term of this patent is extended or adjusted under 35 U.S.C. 154(b) by 0 days.

(21) Appl. No.: 14/563,623

(22) Filed: Dec. 8, 2014

Related U.S. Application Data

(63) Continuation of application No. 13/426,339, filed on Mar. 21, 2012, now Pat. No. 8,918,311.

(51) Int. Cl.
  *G06F 17/27* (2006.01)
  *H04N 5/278* (2006.01)

(52) U.S. Cl.
  CPC ............ *G06F 17/27* (2013.01); *H04N 5/278* (2013.01)

(58) Field of Classification Search
  CPC ............ G06F 17/30796; G06F 17/211; G06F 17/241; G06F 17/243; H04N 21/4307; H04N 21/4312; H04N 21/47217
  USPC .... 704/9, 270, 211; 715/730, 723, 719, 716, 715/251, 202, 201, 200; 707/740; 386/245, 244, 240; 375/240.13; 348/465, 461
  See application file for complete search history.

(56) References Cited

U.S. PATENT DOCUMENTS

| | | | | |
|---|---|---|---|---|
| 5,721,940 A | * | 2/1998 | Luther | G06F 17/243 715/200 |
| 6,172,675 B1 | * | 1/2001 | Ahmad | G11B 27/034 704/255 |
| 6,243,419 B1 | * | 6/2001 | Satou | G06F 17/30796 375/240.13 |
| 6,363,380 B1 | * | 3/2002 | Dimitrova | G06F 17/30787 707/740 |
| 6,473,778 B1 | * | 10/2002 | Gibbon | G06F 17/211 348/468 |
| 6,505,153 B1 | * | 1/2003 | Van Thong | H04N 5/278 348/462 |
| 6,580,437 B1 | * | 6/2003 | Liou | G06F 17/3028 707/E17.012 |

(Continued)

*Primary Examiner* — Michael Colucci
(74) *Attorney, Agent, or Firm* — Finch & Maloney PLLC

(57) ABSTRACT

According to at least one embodiment, a system for generating a plurality of caption frames is provided. The system comprises a memory storing a plurality of elements generated from transcription information, at least one processor coupled to the memory, and a caption engine component executed by the at least one processor. The caption engine component is configured to identify at least one element sequence as meeting predetermined criteria specifying a plurality of caption characteristics, the at least one element sequence including at least one element of the plurality of elements, and store the at least one element sequence within at least one caption frame. The at least one element sequence may correspond to at least one sentence. The transcription information may be time-coded.

22 Claims, 16 Drawing Sheets

(56) References Cited

U.S. PATENT DOCUMENTS

| | | | |
|---|---|---|---|
| 6,710,811 B1* | 3/2004 | Lin | H04L 7/0331 |
| | | | 348/465 |
| 7,346,489 B1 | 3/2008 | Bever et al. | |
| 7,661,121 B2 | 2/2010 | Smith et al. | |
| 8,918,311 B1* | 12/2014 | Johnson | G06F 17/271 |
| | | | 348/461 |
| 2002/0075403 A1* | 6/2002 | Barone, Jr. | H04N 5/44513 |
| | | | 348/461 |
| 2003/0190148 A1* | 10/2003 | Lee | G09B 19/06 |
| | | | 386/244 |
| 2004/0125877 A1 | 7/2004 | Chang et al. | |
| 2004/0170392 A1* | 9/2004 | Lu | G06F 17/30787 |
| | | | 386/240 |
| 2004/0255249 A1* | 12/2004 | Chang | G06F 17/30796 |
| | | | 715/723 |
| 2007/0033515 A1* | 2/2007 | Sull | G06F 17/30796 |
| | | | 715/202 |
| 2007/0118801 A1* | 5/2007 | Harshbarger | G11B 27/031 |
| | | | 715/730 |
| 2007/0253680 A1* | 11/2007 | Mizote | H04N 5/44504 |
| | | | 386/230 |
| 2008/0276159 A1* | 11/2008 | Narayanaswami | G06F 17/241 |
| | | | 715/202 |
| 2010/0257444 A1 | 10/2010 | Bever et al. | |
| 2011/0022394 A1* | 1/2011 | Wide | G06K 9/00718 |
| | | | 704/270 |
| 2012/0304062 A1* | 11/2012 | Schultz | H04N 21/440236 |
| | | | 715/716 |
| 2012/0315009 A1* | 12/2012 | Evans | H04N 5/765 |
| | | | 386/230 |
| 2013/0011121 A1* | 1/2013 | Forsyth | H04N 9/8227 |
| | | | 386/245 |
| 2013/0100347 A1* | 4/2013 | Zinovieva | G11B 27/031 |
| | | | 348/468 |
| 2013/0124984 A1* | 5/2013 | Kuspa | H04N 9/475 |
| | | | 715/255 |

\* cited by examiner

3Play Test Account Files

Search Files [      ] Reset

| ☐ | ID ⇕ | FILE NAME ⇕ | DURATION ⇕ | | AUDIO | -State- ⇕ | | | | |
|---|---|---|---|---|---|---|---|---|---|---|
| | | | | | General Information | | Publish | Meta data | Description | Timeline |
| ☐ | 9219 | Uploading_Files_4may2010.mp4 | 00:02:29 | May2010 | N/A | Complete | ✎ View/Edit | ↓ Download | 🗑 Archive | JOB |
| ☐ | 9217 | Transcript_Editing_4may2010.... | 00:03:09 | May2010 | N/A | Complete | ✎ View/Edit | ↓ Download | 🗑 Archive | |
| ☐ | 9216 | File_Management_4may2010.mp4 | 00:00:49 | May2010 | N/A | Complete | ✎ View/Edit | ↓ Download | 🗑 Archive | |
| ☐ | 9215 | Download_Files3may2010.mp4 | 00:01:47 | May2010 | N/A | Complete | ✎ View/Edit | ↓ Download | 🗑 Archive | |
| ☐ | 9214 | New_Welcome_Video_3may2010.mp4 | 00:03:48 | May2010 | | | | | | |
| | ID | FILE NAME | DURATION | FOLDER | AUDIO | STATE | TRANSCIPT ACTIONS | | | JOB |

5 Files of 5 Found. Showing [10 ⇕] per page [Go]

FIG. 10

3Play Test Account Files

Search Files [          ] Reset

| ☐ | ID ⇕ | FILE NAME ⇕ | DURATION ⇕ | INTERACTIVE TRANSCRIPT | | General Information | Publish | Meta data | Description | Timeline |
|---|---|---|---|---|---|---|---|---|---|---|
| | | | | | | | CAPTIONS | | | TIMESHIFT |
| ☐ | 9219 | Uploading_Files_4may2010.mp4 | 00:02:29 | Interactive Transcript | | | CC Preview Captions | | | ⊘ Timeshift |
| ☐ | 9217 | Transcript_Editing_4may2010... | 00:03:09 | Interactive Transcript | | | CC Preview Captions | | | ⊘ Timeshift |
| ☐ | 9216 | File_Management_4may2010.mp4 | 00:00:49 | Interactive Transcript | | | CC Preview Captions | | | ⊘ Timeshift |
| ☐ | 9215 | Download_Files3may2010.mp4 | 00:01:47 | Interactive Transcript | | | CC Preview Captions | | | ⊘ Timeshift |
| ☐ | 9214 | New_Welcome_Video_3may2010.mp4 | 00:03:48 | | | | | | | |
| | ID | FILE NAME | DURATION | INTERACTIVE TRANSCRIPT | | | CAPTIONS | | | TIMESHIFT |

5 Files of 5 Found. Showing [10 ▼] per page [Go]

INTELLIGENT CAPTION SYSTEMS AND METHODS

CROSS-REFERENCE TO RELATED APPLICATIONS

This application claims benefit under 35 U.S.C. §120 and is a continuation of U.S. patent application Ser. No. 13/426,339 titled "INTELLIGENT CAPTION SYSTEMS AND METHODS" filed Mar. 21, 2012, which is hereby incorporated herein by reference in its entirety.

BACKGROUND

Technical Field

The technical field relates generally to transcription of content and, more particularly, to systems and methods that automatically generate captions from transcripts.

Background Discussion

Conventional approaches for creating captions of content integrate computing technology with manual effort. For instance, in some approaches, computer systems accept media files and use automatic speech recognition to create draft transcripts of the media files.

The draft transcripts may then be edited by human transcriptionists and subsequently processed to create caption frames that are embedded in the media files.

Presently, this caption post-processing is performed either manually or by simplistic computer processes. For instance, where the type of content requires special expertise to create accurate captions (e.g., a university mathematics lecture including specialized terms), manual post-processing may be utilized. In other instances, computer processes may build captions by iterating through the words included in the transcript and placing the words within caption frames according to the capacity of the caption frame.

If a downstream customer finds problems in the transcripts or captions, editors or customers can edit the transcripts. To propagate the edits made in the transcripts to the captions, the edited transcript may be subject to the same post processing performed on the previous version to create captions that reflect the edits made to the edited transcript.

SUMMARY

At least some aspects and embodiments disclosed herein provide for computer systems and computer-implemented methods that automate caption creation and that enhance caption readability. For instance, one such system is provided by 3Play Media of Cambridge, Mass. The 3Play Media system accepts media files uploaded by customers who wish to have time-coded transcriptions and, ultimately, captions, produced for each file. The 3Play Media system processes these files using an automatic speech recognition component to create a preliminary time-coded textual transcription of the audio in the media file. In addition, the 3Play Media system provides a transcription editing platform that optimizes correction of automatic speech recognition output to create a high-quality transcription. This platform provides authorized editors with access to the automatic speech recognition drafts and media files associated with the drafts via a 3Play Media server. While the editor remains authorized, the platform processes edits made by the editor to the speech recognition output, including word corrections, format corrections, time-code modifications, and speaker identification. The platform can also store the corrected transcription on the 3Play Media server.

Some embodiments of the 3Play Media system also provide a customer interface that may receive a request from an authorized customer to produce captions from the time-coded transcription. While the customer remains authorized, the customer interface may generate captions for media files owned by the customer in a variety of formats, with customer-configurable settings, and may download these captions to a computer designed by the customer for the customer's use in publishing their media. Where the customer is authorized to edit time-coded transcriptions, the customer interface may receive edits to the time-coded transcriptions, save the edits, and regenerate captions which reflect the changes to the underlying transcription.

At least one version of the caption-generating software provided by the 3Play Media system uses word-level time-codes produced in earlier processing phases, in conjunction with the constraints imposed by the customer (or default constraints), to produce captions for the original media. Features of various embodiments include:

Captions that may be framed at sensible textual boundaries, as determined by grammatical units, decreasing the incidence of mid-phrase cutoffs.

Caption framing that may be configured to favor higher-level grammatical units.

Captions that may be formatted in a textually balanced manner, both at the frame level and the line level where frames support two or more lines.

Caption frames that may be timed to improve readability.

Caption frames that may be formatted using customer-provided metadata.

Caption formatting that may be configured by customers.

Multiple caption formats that may be maintained to facilitate individual preferences.

Captions that may be regenerated automatically subsequent to multiple stages of transcript editing.

Captions that may be regenerated automatically in real-time or near real-time to conform to requirements and configurations of media players.

According to at least one embodiment, a system for generating a plurality of caption frames is provided. The system comprises a memory storing a plurality of elements generated from transcription information, at least one processor coupled to the memory, and a caption engine component executed by the at least one processor. The caption engine component is configured to identify at least one element sequence as meeting predetermined criteria specifying a plurality of caption characteristics, the at least one element sequence including at least one element of the plurality of elements, and store the at least one element sequence within at least one caption frame. The at least one element sequence may correspond to at least one sentence. The transcription information may be time-coded.

In the system, the caption engine component may be further configured to identify an element sequence as not meeting the predetermined criteria, relax the predetermined criteria, identify the element sequence as meeting the relaxed criteria, and store the element sequence within a caption frame. The predetermined criteria may include a criterion specifying that text included in the at least one element sequence have a length less than a predetermined length. The length may reflect annotations included in the text.

In the system, the at least one caption frame may include a plurality of caption frames and the at least one element sequence may include a plurality of element sequences. The caption engine component may be further configured to associate elements included within the plurality of element sequences with caption frames included within the plurality of caption frames such that variance of a characteristic associated with the plurality of caption frames is reduced. The caption engine component may also be further configured to identify underutilized space within the at least one element and shift at least one of a begin time and an end time of a caption frame adjacent to the at least one caption frame to encompass the underutilized space.

The system may further comprise a parser component executed by the at least one processor and configured to generate the plurality of elements by executing at least one parse of the transcription information. The parser component may be configured to structure elements generated by the at least one parse into at least one parse tree. The at least one parse may include a plurality of parses and each parse of the plurality of parses is associated with a score.

The system may favor generation of captions including more complex grammatical structures over less complex grammatical structures. For instance, in the system, the predetermined criteria may include a criterion specifying that elements including more complex grammatical structures be identified over element including less complex grammatical structures.

In the system, the predetermined criteria may include a criterion specifying that the at least one element sequence end with an element other than an element deemed inseparable from a subsequent element. The element deemed inseparable from the subsequent element may include at least one of a predetermined part-of-speech tag, a predetermined punctuation mark, and an annotation. In the system, the predetermined criteria may include a criterion specifying that the at least one element sequence have a minimum display duration greater than a predetermined number. The minimum display duration may be measured in at least one of duration per word and duration per character.

According to another embodiment, a method of generating a plurality of caption frames is provided. The method includes acts of identifying at least one element sequence as meeting predetermined criteria specifying a plurality of caption characteristics, the at least one element sequence including at least one element of a plurality of elements and associating at least one caption frame of the plurality of caption frames with at least one element sequence.

In the method, the at least one caption frame may include a plurality of associated caption frames and the at least one element sequence may include a plurality of associated element sequences and the method may further comprise an act of associating elements included within the plurality of element sequences with caption frames included within the plurality of caption frames such that variance of a characteristic associated with the plurality of caption frames is reduced.

The method may further comprise an act of executing at least one parse of transcription information to generate the plurality of elements. In the method, the act of identifying at least one element sequence as meeting predetermined criteria may include an act of identifying an element including more complex grammatical structures over an element including less complex grammatical structures.

According to another embodiment, a computer readable medium storing instructions executable by at least one processor of a computer system is provided. The instructions instruct the computer system to identify at least one element sequence as meeting predetermined criteria specifying a plurality of caption characteristics, the at least one element sequence including at least one element of a plurality of elements and associate at least one caption frame of the plurality of caption frames with at least one element sequence. The instructions to identify the at least one element sequence as meeting predetermined criteria may include instructions to identify an element including more complex grammatical structures over an element including less complex grammatical structures. In addition, the instructions may further instruct the computer system to execute at least one parse of transcription information to generate the plurality of elements.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 10 is an illustration of a user interface screen provided by a caption system;

FIG. 11 is an illustration of another user interface screen provided by a caption system;

FIG. 12 is an illustration of another user interface screen provided by a caption system;

FIG. 13 is an illustration of another user interface screen provided by a caption system:

FIG. 14 is an illustration of another user interface screen provided by a caption system;

FIG. 16 is an illustration of another user interface screen provided by a caption system.

DETAILED DESCRIPTION

Some embodiments disclosed herein include apparatus and processes for generating, using a computer system, captions descriptive of content included in media files. Various apparatus and processes included in these embodiments implement a variety of useful features. For example, according to one embodiment, a process executed by a specially configured computer system builds caption frames in accord with grammatical rules, thereby enhancing the readability of captions. In another embodiment, a process executed by the computer system distributes characters included in a two-line caption such that the number of characters on each line is approximately equal. In another embodiment, a process executed by a computer system distributes words across successive frames such that the number of words in the successive frames is approximately equal. In still another embodiment, a process executed by the computer system builds caption frames such that the characters included therein are displayed on the screen for a predetermined minimum duration. In other embodiments, a process executed by the computer system presents a user interface that receives configuration information. In these embodiments, the received configuration information directs the computer system to control the behavior of these caption formatting processes.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Caption System

Figure 1:
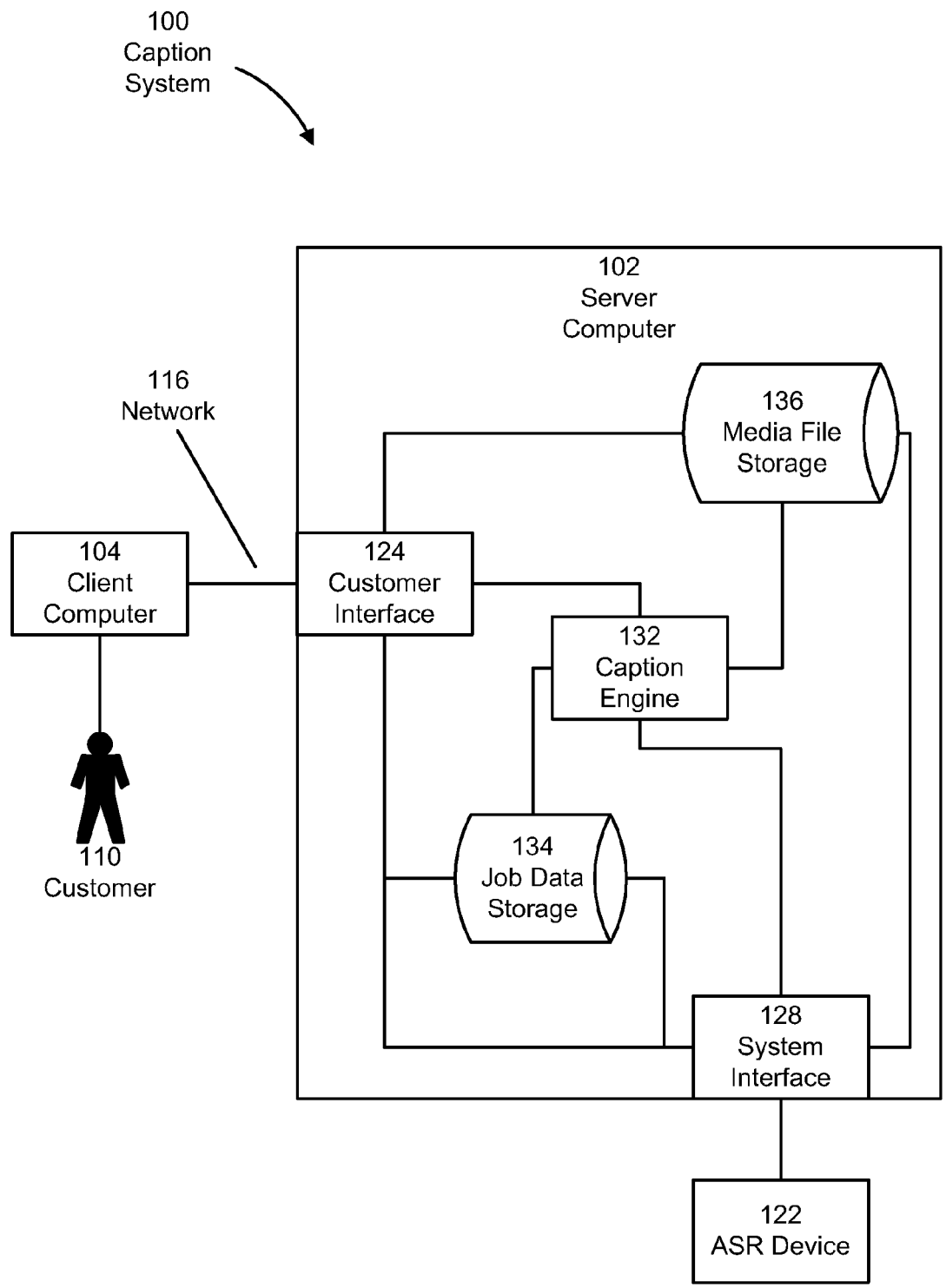
FIG. 1 is a context diagram including an exemplary caption system.

Various embodiments utilize one or more computer systems to implement a caption system that is configured to receive media files from customers and to provide, to the customers, caption information corresponding to transcriptions of the content included in the media files. FIG. 1 illustrates one of these embodiments, a caption system 100. As shown, FIG. 1 includes a server computer 102, client computer 104, a customer 110, networks 116, and an automatic speech recognition ("ASR") device 122. The server computer 102 includes several components: a customer interface 124, a system interface 128, a caption engine 132, job data storage 134, and a media file storage 136.

As shown in FIG. 1, the system interface 128 exchanges (i.e. sends or receives) media file information with the ASR device 122. The customer interface 124 exchanges information with the client computer 104 via the network 116. The network 116 may include any communication network through which computer systems may exchange information. For example, the network 116 may be a public network, such as the internet, and may include other public or private networks such as LANs, WANs, extranets and intranets.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

In some embodiments illustrated by FIG. 1, the caption system 100 receives media files, and other information, from the customer 110 via the customer interface 124. In these embodiments, the customer interface 124 is configured to provide a user interface to the customer 110 via the network 116 and the client computer 104. For instance, in one embodiment, the customer interface 124 is configured to serve a browser-based user interface to the customer 110 that is rendered by a web-browser running on the client computer 104. In this embodiment, the customer interface 124 exchanges information with the customer 110 via this user interface and stores the exchanged information within the job data storage 134 or the media file storage 136. Examples of information stored in the job data storage 134 include information descriptive of captions, media files, customers, projects, and transcriptions. Information descriptive of captions may include caption formatting instructions specifying exemplary, predefined annotations that are preferred or required for use by editors to mark content within a project or supplied by a customer. These predefined annotations may be displayed to editors via an editor interface, such as an editor interface as described in copending U.S. patent application Ser. No. 13/246,123, entitled "ELECTRONIC TRANSCRIPTION JOB MARKET," ("the '123 Application") which is hereby incorporate herein by reference in its entirety. Examples of these predefined annotations include speaker names (to ensure consistent spelling), special speaker titles (e.g., ANNOUNCER, SUBJECT, INTERVIEWER, etc.). Examples of information stored in the media file storage 136 include media files, transcription files, and caption files. Both the job data storage 134 and the media file storage 136 are described further below with reference to FIG. 2.

Information within the caption system 100, including data within the job data storage 134 and the media file storage 136, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

In other embodiments, the customer interface 124 is configured to perform a variety of processes in response to exchanging information via the user interface. For instance, in one embodiment, after receiving one or more media files via the user interface, the customer interface 124 provides the caption engine 132 with an identifier of newly stored, unprocessed media files. In other embodiments, after receiving one or more media files via the user interface, the customer interface 124 issues a request for ASR processing to the system interface 128.

In other embodiments, the customer interface 124 is configured to facilitate a caption creation process executed by the customer 110. In executing in this configuration, the customer interface 124 may interact with the caption engine 132, the job data storage 134, the media file storage 136, and the system interface 128. An example of one such caption creation process is described further below with reference to FIG. 9.

According to another example illustrated by FIG. 1, the customer interface 124 provides information describing one or more parses of transcription information to a user via the user interface. As described further below, this parse information may grammatically structure text included in tokens stored the transcription information. This parse information may be subsequently processed by caption generation processes, such as the caption generation processes described further below with reference to FIGS. 4-16.

In another example illustrated by FIG. 1, the customer interface 124 receives media file information from the user interface. This media file information includes a media file and information indicating a knowledge domain to which the content included in the media file belongs. Responsive to receipt of this media file information, the customer interface 124 stores the media files in the media file storage 136 and stores a unique identifier of the media file, and the domain information in the job data storage 134.

According to another example illustrated by FIG. 1, the customer interface 124 receives media file information from the user interface. This media file information includes a media file and media file information indicating a project to be associated with the media file from which the domain may be derived. A project is a set of media files grouped by a customer according to domain or other media file attribute. Responsive to receipt of this media file information, the customer interface 124 stores the media files in the media file storage 136 and stores a unique identifier of the media file and other media file information in the job data storage 134.

According to another example illustrated by FIG. 1, the customer interface 124 provides media file information to the user interface. This media file information includes unique identifiers of one or more media files previously received from the customer 110 and the project information associated with the received media files. In this example, the customer interface 124 receives modifications to the provided media file information made by the customer 110 via the user interface. Responsive to receiving the modifications, the customer interface 124 stores the modifications in the job data storage 134 and the media file storage 136.

Although the examples described above focus on a web-based implementation of the customer interface 124, embodiments are not limited to a web-based design. Other technologies, such as technologies employing a specialized, non-browser based client, may be used to implement the user interface without departing from the scope of the aspects and embodiments disclosed herein. For instance, according to one embodiment, the customer interface 124 is a simple, locally executed upload client that allows the customer to do nothing more than upload media files to the server via FTP or some other protocol.

According to various embodiments illustrated by FIG. 1, the caption engine 132 is configured to produce caption information including highly readable captions from transcription information stored in the job data storage 124 and the media file storage 136. As is further described below, in some embodiments, the transcription information used to create the caption information is created automatically by an ASR device, such as the ASR device 122. In other embodiments, the transcription information is created by a job transcription market, such as the job transcription market 100 described in FIG. 1 of '123 Application. In these embodiments, the transcription may include edits made by professional editors as detailed in the '123 Application. These edits may include modified text, timing information, punctuation marks, and annotations, among other information.

In one embodiment illustrated by FIG. 1, the caption engine 132, in executing according to its configuration, exchanges information with the customer interface 124, the system interface 128, the job data storage 134, and the media file storage 136. The exchanged information may include any information used by the caption system 100 to generate and store caption information. Specific examples of exchanged information include caption information, media file information, customer information, project information, and transcription information.

According to one embodiment illustrated in FIG. 1, the caption engine 132 is configured to send a request for ASR processing of unprocessed media files to the system interface 128. In these embodiments, the system interface 128 is configured to receive requests for ASR processing, and, in response to these requests, provide the unprocessed media files to the ASR device 122. The ASR device 122 is configured to receive a media file, to perform automatic speech recognition on the received media file and to respond with draft transcription information that includes a draft transcription of the content of the received media file. The draft transcription information also includes synchronization information, such as time coding or frame coding, that associates tokens included in the draft transcription with particular portions of the received media file. In other embodiments, the system interface 128 is further configured to receive the draft transcription information, store the draft transcription information in the job data storage 134 and the media file storage 136, and notify the caption engine 132 of the availability of the draft transcription information.

In one example illustrated by FIG. 1, the caption engine 132 receives an identifier of a newly stored media file from the customer interface 124. Responsive to receipt of this identifier, the caption engine 132 provides a request to perform ASR processing on the media file to the system interface 128. The system interface 128, in turn, retrieves the media file from the media file storage 136 and provides the media file, along with a set of parameters that indicate appropriate language, acoustic, and formatting models, to the ASR device 122. The ASR device 122 processes the media file and responds with draft transcription information that includes a time-coded draft transcription, and other associated data. The system interface 128 receives the draft transcription information, stores the draft transcription information in the job data storage 134 and the media file storage 136 and notifies the caption engine 132 of the availability of the draft transcription information.

In some embodiments, the caption engine 132 is configured to identify unprocessed transcription information stored in the job data storage 134 and the media file storage 136. In some of these embodiments, the caption engine 132 identifies unprocessed transcription information after receiving an indication of the storage of one or more unprocessed transcriptions from another component, such as the customer interface 124 or the system interface 128 described above. In others of these embodiments, the caption engine 132 identifies unprocessed transcription information by periodically executing a query, or some other identification process, that identifies new, unprocessed transcriptions by referencing information stored in the job data storage 134 or the media file storage 136.

In other embodiments, the caption engine 132 is configured to perform a variety of processes in response to identifying unprocessed transcription information or in response to receiving a notification identifying unprocessed transcription information that is available. For instance, in one embodiment, after identifying that unprocessed draft transcription information is available, the caption engine 132 determines whether a professionally edited version of the draft transcription is available. If so, the caption engine 132 uses the transcription information that includes the professionally edited version of the draft transcription to generate captions as described further below. If not, the caption engine 132 either uses the transcription information that includes the ASR-generated version of the draft transcription to generate captions, or defers generation of captions until a professionally edited version becomes available.

In some embodiments, the caption engine 132 is configured to, as an initial step in generating captions, employ natural language processing techniques to determine the domain of the subject matter presented in the transcription information and to store this domain information in the job data storage 134. In these embodiments, in response to determining, or receiving, an indication of the domain of subject matter presented in the transcription information, the caption engine 132 identifies and selects a general parser, a specialized parser, or a parser trained with a specialized linguistic bank, based on the domain information associated with the transcription information. For example, if the media file includes a presentation describing combinatorics in the Mandarin language, the caption engine 132 may select a specialized parser that is trained with Mandarin linguistic bank that includes mathematics nomenclature. In this way, the caption engine 132 selects a parser that is likely to perform well given the subject matter of the transcription information.

In other embodiments, the caption engine 132 is configured to utilize the selected parser, or some other predetermined parser (e.g., the Stanford parser), to parse the transcription information into parse information. The linguistic organization of the parse information generated by the utilized parser may structure text stored in tokens included in the transcription information into one or more elements according to paragraphs, sentences, phrases, words, and punctuation included in the transcription information. Each element may be associated with one or more part-of-speech ("POS") tags.

In some embodiments, the parser used is a statistical parser, and the parse information may be associated with a score that characterizes the accuracy of the linguistic organization included in the parse information. In other embodiments, the parser used may generate a discrete element for each respective token included in the transcription information and may associate each element with a POS tag. Such a parser may be particularly useful where, for example, a statistical parser is unable to return a successful parse. In some embodiments, the utilized parser determines the POS tag to associate with an element by identifying the token included in the element in a table that relates tokens to POS tags.

According to various embodiments, the caption engine 132 organizes parse elements into a variety of groups and relationships. For instance, in at least one embodiment, the caption engine 132 stores each element, timing information associated with the element, and any POS tags associated with the element in a data structure such as the parseElement data structure described below. In other embodiments, the elements may be loaded into a singly linked list, a doubly linked list, a circularly linked list, a single or multidimensional array or one or more tree structures. Thus embodiments are not limited to a tree or any other particular data structure.

In at least one embodiment, the caption engine 132 is configured to load the parse information into one or more hierarchical parse trees that include elements within tree nodes. Also in these embodiments, each tree node included in each parse tree includes a data structure such as the following parseElement data structure:

struct parseElement
    string words // Contains terminal tokens, with spaces
    int string_length // Length includes all internal spaces
    int level // Depth in tree
    float begin_time
    float end_time
    string part_of_speech_tag
    parseElement nextElement //At the same level (null at last element of level)
    parseElement nextLevel //First element at next level (null for leaves) end As shown, this exemplary parseElement data structure includes the following fields: words, string_length, level, begin_time, end_time, part_of_speech_tag, nextElement, and nextLevel. The words field stores a string of tokens included in the transcription information. The string_length field stores an integer that represents the length of the words field. The level field stores an integer that represents the level of the tree node including this parseElement. The begin_time stores a floating point representation of a starting point of a window within in the media file associated with the tokens included in the words field. The end_time stores a floating point representation of an ending point of the window within the media file. The part_of_speech_tag stores a string representative of the part-of-speech of the tokens included in the words field. The nextElement field stores a reference to a parseElement included in the next tree node at the same level of the tree as the tree node including this parseElement. The nextLevel field stores a reference to a parseElement included in the first child node of the node including this parseElement.

In at least one embodiment, each level of a hierarchical parse tree corresponds to a grammatical structure having a different level of complexity. For instance, leaf nodes of a hierarchical parse tree may represent tokens included in the transcription information. Parents of the leaf nodes may represent phrases including the tokens stored in their children. Thus a linear parse of the tokens included in the transcription information may be identified by a traversing the leaf nodes of the parse tree. Parents of the phrase nodes may represent clauses including the phrases stored in their children. Parents of the clause nodes may represent sentences including the clauses stored in their children. Parents of the sentence nodes may represent paragraphs including the sentences stored in their children. This increasing grammatical complexity may continue to progress as the tree is walked from the leaf nodes toward to root node. Particular examples of hierarchical parse trees are described further below with reference to FIGS. 7 and 8.

In some embodiments, the caption engine 132 is configured to build caption frames from elements (e.g. parseElements) by executing a framing process. In one embodiment, the framing process builds caption frames using sub-elements included in elements in conjunction with caption-length, words per second, characters per second, or other constraints. Examples of sub-elements of an element include elements stored within tree nodes that are children of the node storing the element. In other embodiments, the framing process favors use of elements stored within higher levels of a parse tree over use of elements stored within lower levels of the parse tree, thereby favoring grammatical structures of increased complexity over those having less complexity. One example of a framing process implemented by the caption engine 132 is described further below with reference to FIG. 5.

In other embodiments, the caption engine 132 is configured to balance text across a consecutive series of caption frames by executing a balancing process. In one embodiment, the balancing process uses elements associated with caption frames, and sub-elements of the associated elements, to decrease or minimize the variance of a characteristic associated with the series of caption frames. The balancing process may utilize sub-elements to split an associated element across two caption frames. One example of a balancing process implemented by the caption engine 132 is described further below with reference to FIG. 6.

After this processing is complete, in some embodiments, the caption engine 132 is configured to make finalized caption information available to the customer, who may then download the finalized caption information for his or her own use via the customer interface 124. The finalized caption information is also maintained in the media file storage 136 for reference and further processing, as discussed herein.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the caption system 100 or unauthorized access to the caption system 100.

Figure 2:
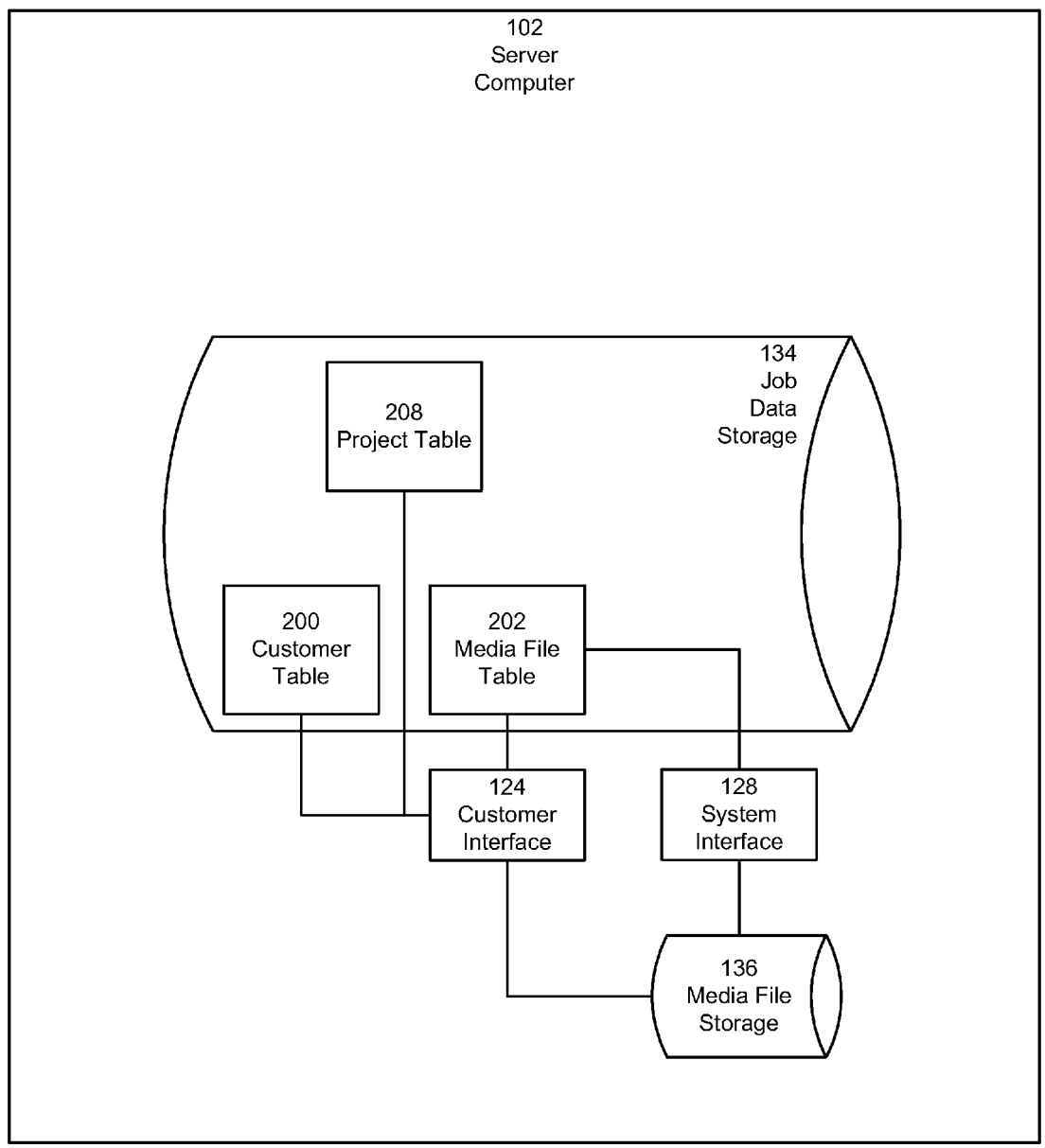
FIG. 2 is a schematic diagram of the server computer shown in FIG. 1, including data stores.

FIG. 2 illustrates the server computer 102 of FIG. 1 in greater detail. As shown in FIG. 2, the server computer 102 includes the job data storage 134, the customer interface 124, the system interface 128, and the media file storage 136. In the embodiment illustrated in FIG. 2, the job data storage 134 includes a customer table 200, a media file table 202, and a project table 208.

In the embodiment illustrated in FIG. 2, the media file storage 136 includes a file system configured to store media files, transcription files, and caption files and acts as a file server for other components of the caption system. In another embodiment, the media file storage 136 includes identifiers for files stored on another computer system configured to serve files to the components of the caption system.

In some embodiments, transcription information includes a (time-coded or non timecoded) transcription of the content included in a media file. A time-coded transcription is comprised of a textual representation of the content of the media file, where each token has associated with it indicia of the location in the media file to which it applies. The tokens may include words, numerics, punctuation, speaker identification, formatting directives, non-verbal annotations (such as [BACKGROUND NOISE], [MUSIC], [LAUGHTER], [PAUSING]) and other markings or text that may be useful in describing the media file content. The empty string may also be used as a token, in which case the location indicia serves to keep the transcription synchronized with the media file content in the absence of useful textual information. In the case of the transcription from the ASR device, these empty-string tokens may be used if the ASR process was confident that some transcription-worthy event has occurred at that location, but is unsure of the particular identity of that event. In this case, having the location indicia associated with the event facilitates synchronized correction. In at least some embodiments, at least some of this transcription information is stored in the media file storage 136 as a transcription file. Table 1 illustrates one example of time-encoded transcription information:

TABLE 1

| Caption Text | Begin Time | End Time |
|---|---|---|
| Our | 0.0 | 0.2 |
| hospital | 0.2 | 0.55 |
| is | 0.55 | 0.66 |
| an | 0.66 | 0.70 |
| academic | 0.70 | 1.15 |
| teaching | 1.15 | 1.73 |
| facility | 1.73 | 2.36 |
| serving | 2.36 | 2.81 |
| the | 2.81 | 2.94 |
| greater | 2.94 | 3.27 |
| Toronto | 3.27 | 3.75 |
| area. | 3.75 | 4.50 |
| Every | 4.50 | 5.50 |
| day | 5.50 | 5.83 |
| we | 5.83 | 6.02 |
| produce | 6.02 | 6.46 |
| thousands | 6.46 | 6.95 |
| upon | 6.95 | 7.27 |
| thousands | 7.27 | 8.11 |
| of | 8.11 | 8.25 |
| documents. | 8.25 | 9.11 |
| [SILENCE] | 9.11 | 9.50 |

In some embodiments, caption information includes text and timing information (e.g., begin time and end time)

relative to a predetermine location (e.g., the start) within the media. The timing information indicates a section within the media during which the text should be superimposed upon the media. The caption information may also include line-break information, indicating where the text should be split into different lines. In some embodiments, caption information may include positioning information for text, such as the pixel x, y coordinates indicating where beginning of the text should appear superimposed on the media. In other embodiments, the caption may include formatting information such as language, character encoding, text justification, font, font-size, balding, underlining, and italicizing, among other formatting information. In at least one embodiment, the caption information may include information that is configured according to any of several standards for caption information, such as the SRT format, the W3C timed text format, and the DFXP format, among others.

The customer table 200 stores information descriptive of the customers who employ the caption system to have their media files captioned. In at least one embodiment, each row of the customer table 200 stores information for a customer and includes a customer_id field, and a customer_name field. The customer_id field stores an identifier of the customer that is unique within the caption system. The customer_name field stores information that represents the customer's name within the caption system. The customer_id is used as a key by a variety of functions disclosed herein to identify information belonging to a particular customer.

The media file table 202 stores information descriptive of the media files that have been uploaded to the caption system for processing. In at least one embodiment, each row of the media file table 202 stores information for one media file and includes the following fields: file_id, file_name, customer_id, state, duration, domain, transcript_location, instructions, and caption_location. The file_id field stores a unique identifier of the media file. The file_name field stores the file system name of the media file. The customer_id field stores a unique identifier of the customer who provided the media file. The state field stores information that represents the state of the media file. The duration field stores information that represents the duration of the content of the media file. The domain field stores information that identifies a subject matter domain to which the media file belongs. The transcript_location field stores an identifier of a location of transcription information associated with the media file. The instructions field stores caption formatting instructions associated with the media file. The caption_location field stores an identifier of a location of caption information associated with the media file. The file_id is used as a key by a variety of functions disclosed herein to identify information associated with a particular media file. In some embodiments, the media file table 202 may store multiple versions of caption information associated with particular transcription information. Each of these versions may be produced using different configurations and each may reflect different user preferences, including preferences motivated by constraints of various media players.

In the embodiment of FIG. 2, the project table 208 stores information descriptive of projects that the caption system is being utilized to complete. In at least one embodiment, each row of the project table 208 stores information for a project and includes an project_id field, a project_name field, a customer_id field, and a domain field. The project_id field stores information that identifies a group of media files that belong to a project. The project_name field stores information that represents the project's name within the caption system. The customer_id field indicates the customer to whom the project belongs. The domain field stores information that identifies a subject matter domain of media files included in the project. The project_id is used as a key by a variety of functions disclosed herein to identify information grouped into a particular project.

Various embodiments implement the components illustrated in FIG. 2 using a variety of specialized functions. For instance, according to some embodiments, the customer interface 124 uses a File_Upload function and a File_Update function. The File_Upload function uploads a file stored on a customer's computer to the server computer 102 and accepts parameters including customer_id, project_id, filename, and optionally, domain. The customer_id parameter identifies the customer's unique customer_id. The project_id identifies the project to which the media file belongs. The filename parameter specifies the name of the media file to be uploaded by the customer interface 124. The domain parameter specifies the subject matter domain to which the media file belongs. In at least one embodiment, if the domain parameter is not specified, the caption engine 132 determines the value of the domain parameter from the value of the domain field of a record stored within the project table 208 that has a project_id field that is equal to the project_id parameter.

In other embodiments, the File_Update function updates an attribute of a media file record and accepts parameters including file_id, attribute, and value. The file_id parameter identifies the media file record with attributes that will be modified as a result of execution of the File_Update function. The attribute parameter identifies an attribute to be modified. In at least one embodiment, this attribute may be the domain or state of the media file, as stored in the media file table 202. The value parameter specifies the value to which the attribute is to be set as a result of executing the File_Update function.

In other embodiments, the system interface 128 uses a File_Send_to_ASR function and a File_Create_Draft function. The File_Send_to_ASR function provides a media file to the ASR device 122 and causes the ASR device 122 to perform automatic speech recognition on the content included in the media file. The File_Send_to_ASR function accepts parameters including file_id. The file_id parameter identifies the media file to be processed by the ASR device 122.

In other embodiments, the File_Create_Draft function creates draft transcription information for a media file and accepts parameters including file_id and ASR_output. The file_id parameter identifies the media file for which the draft transcription information will be created by execution of the File_Create_Draft function. The ASR_output parameter specifies the location of the ASR output generated by the ASR device 122 during its processing of the media file.

In other embodiments, the File_Create_Caption function creates caption information from transcription information and accepts parameters including file_id, caption_location, and transcript_location. The file_id parameter identifies the media file for which the caption information will be created by execution of the File_Create_Caption function. The caption_location parameter specifies the location to which the File_Create_Caption function will store the caption information. The transcript_location parameter specifies the location of the transcription information that the File_Create_Caption function will use to generate the caption information.

Embodiments of the caption system 100 are not limited to the particular configuration illustrated in FIGS. 1 and 2.

Various examples utilize a variety of hardware components, software components and combinations of hardware and software components configured to perform the processes and functions described herein. In some examples, the caption system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
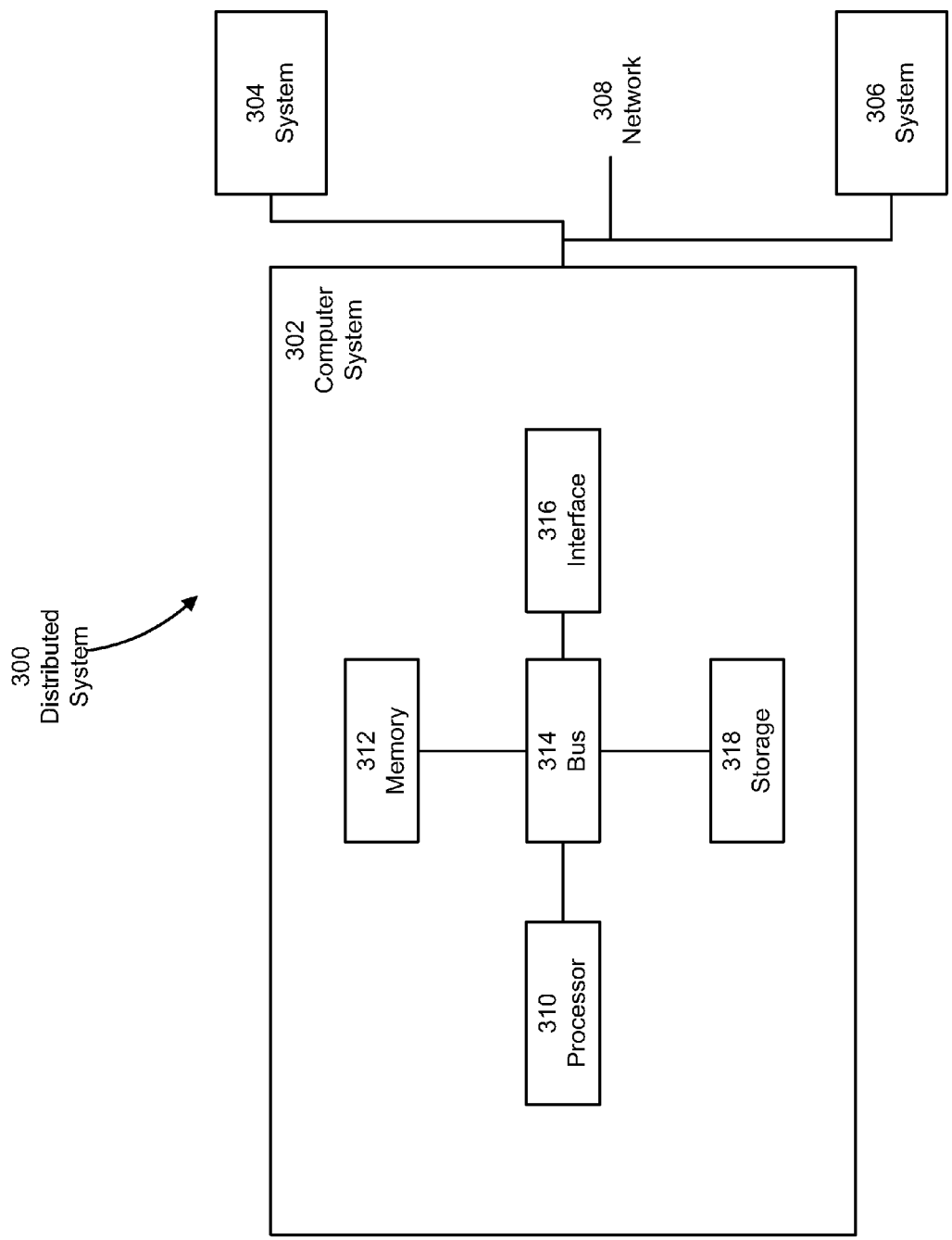
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM PowerS+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (CSharp). Other object-oriented programming languages may also be used. Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements. e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Caption System Processes

Figure 4:
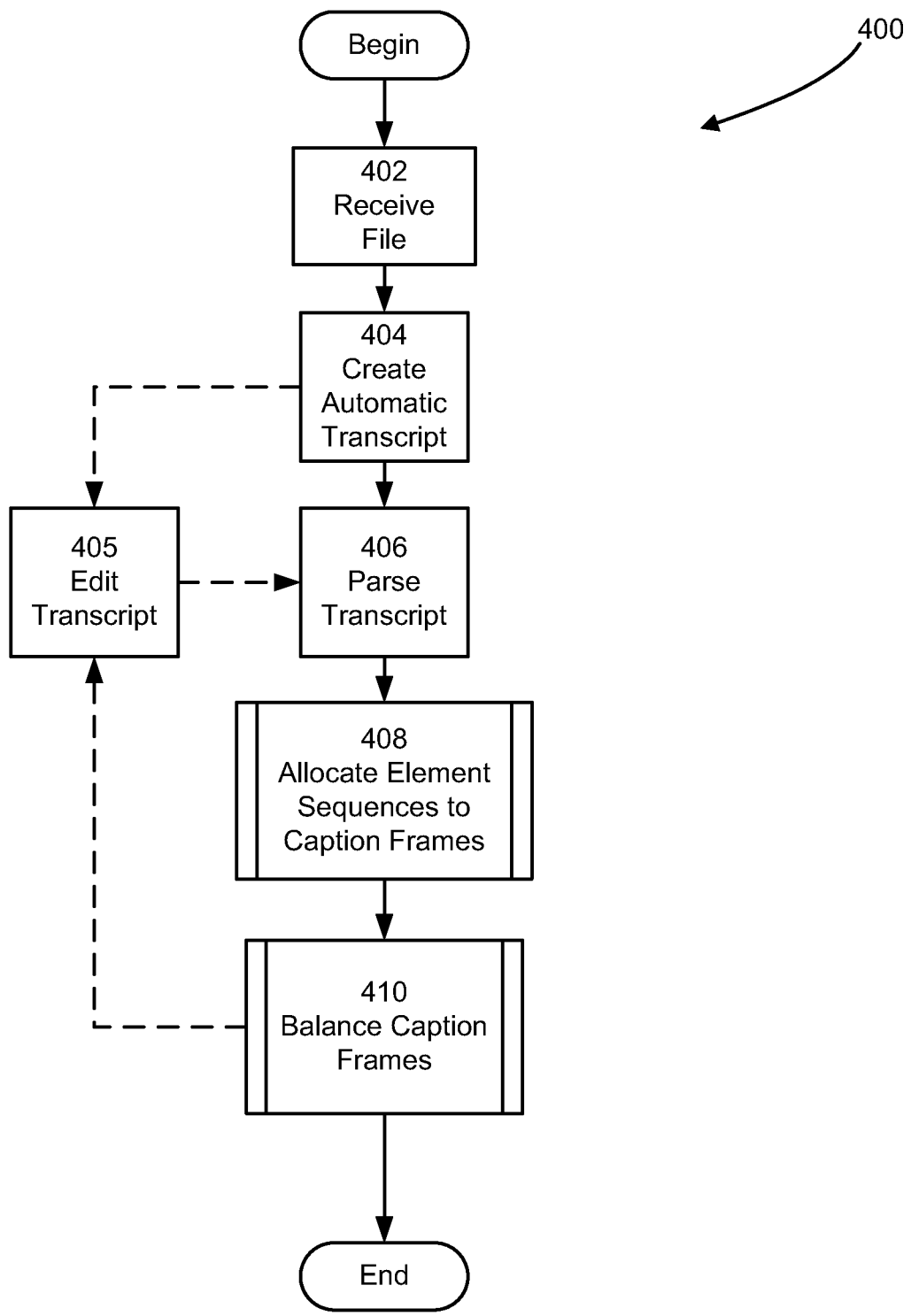
FIG. 4 is a flow diagram illustrating a process for generating captions.

In some embodiments processes are performed that generate captions using a caption system, such as the caption system 100 described above with reference to FIG. 1. An example of one of these caption generation processes is illustrated by FIG. 4. According to this example, the caption generation process 400 includes acts of receiving a media file, creating an ASR transcription, editing a transcription, parsing a transcription, allocating element sequences to caption frames, and balancing caption frames and storing caption information.

In act 402, the caption system receives a media file including content to be captioned. In at least one embodiment, the caption system receives the media file via a customer interface, such as the customer interface 124 described above with reference to FIG. 1. In this embodiment, the customer interface stores the media file in a media file storage, such as the media file storage 136 described above with reference to FIG. 1.

Next, in act 404, the customer interface requests that an ASR device, such as the ASR device 122 described above with reference to FIG. 1, produce draft transcription information via a system interface, such as the system interface 128 described above with reference to FIG. 1. In response to receiving the request, the ASR device produces draft transcription information for the media file and provides the draft transcription information to the system interface. In at least one embodiment, the system interface, in turn, executes the File_Create_Draft function described above to create a draft transcription file from ASR output included in the draft transcription information. The system interface next stores the draft transcription file in the media file storage and stores media file information descriptive of the media file and draft transcription information descriptive of the draft transcription file in a job data storage, such as the job data storage 134, described above with reference to FIG. 1.

In act 405, the customer interface or an editor interface, such as an editor interface as described in the '123 Application, modifies the draft transcription information to improve its accuracy. For example, the customer interface or the editor interface may receive edits to the draft transcription information via a user interface. These edits may alter any aspect of the draft information including the text included in a token, or media sequencing (timing) information associated with or stored within the token. Further, these edits may add annotations (e.g., non-verbal descriptions of transcription information, such as [ANNOUNCER:], [CROWD NOISE], [SILENCE]) to the draft transcription information. In some embodiments, these annotations are disassociated with neighboring grammatical structures during subsequent processing, such as parsing of the transcription information. Responsive to receipt of the edited transcription information, the customer interface or editor interface stores the edited transcription information for subsequent processing. Examples of some additional actions taken by the customer interface during act 405 are described further below with reference to FIG. 9.

After the draft transcription information is created (and in some examples, edited), the caption system parses the draft or edited transcription information in act 406 by executing a caption engine, such as the caption engine 132 described above with reference to FIG. 1. In some embodiments, the caption engine parses the transcription information in response to a request to generate captions received from another component, such as the customer interface or the system interface. In other embodiments, in parsing the transcription information, the caption engine creates a parse tree for each sentence included in the transcription information and populates, for each sentence, a data structure that stores parse information. In still other embodiments, the caption engine may create a parse tree (or other data structure) for each paragraph (or other grammatical structure) within the transcription information. In at least one embodiment, the caption engine stores parse information for each element in the parseElement data structure described above with reference to FIG. 1. In this embodiment, the caption engine creates an ordered list of the elements for future processing. This ordered list may represent the entirety of, or a portion of, the transcription information.

In act 408, the caption engine allocates element sequences included in the parse to caption frames and stores caption information based on the caption frames. One example of a process executed within the caption engine in the act 408 is described below with reference to FIG. 5. In act 410, the caption system balances the caption frames, stores caption information based on the caption frames, and terminates the caption generation process 400. One example of a process executed within the caption engine in the act 410 is described below with reference to FIG. 6.

Figure 5:
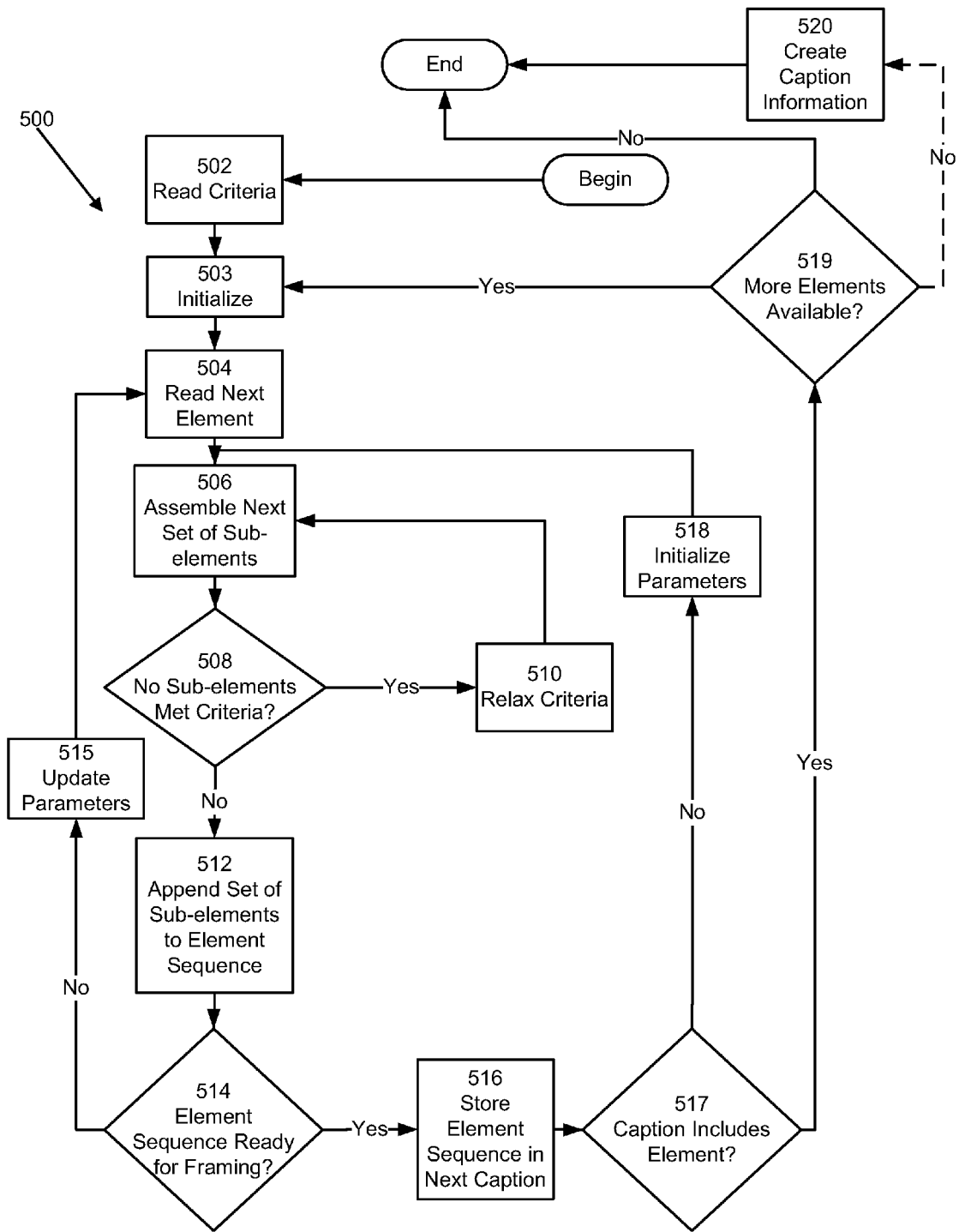
FIG. 5 is a flow diagram illustrating a process for associating element sequences with captions.

As discussed above with reference to FIGS. 1 and 4, in some embodiments processes that automatically frame transcription information within captions are performed using a caption system, such as the caption system 100 described above with reference to FIG. 1. An example of one of these framing processes is illustrated by FIG. 5. According to this example, the framing process 500 includes several acts that are described further below.

In act 502, a caption engine, such as the caption engine 132 described above with reference to FIG. 1, reads criteria used to determine elements that are acceptable for inclusion within a caption frame. These criteria may specify one or more target characteristics for a caption. For instance, in one embodiment this criteria specifies a maximum length for a caption, a maximum number of lines per caption, a maximum length for a line of a caption, a maximum level within the parse tree for elements, a minimum display duration measured in duration per word or duration per character, and that caption lines may not end with elements internal to a phrase (or other predetermined grammatical structure) stored in leaf nodes at or above a certain level within the parse tree. In some embodiments, the criteria are parameters that are configurable via a user interface presented by the caption system.

In act 503, the caption engine initializes a data structure to hold a sequence of elements. This data structure may represent the set of caption frames for the entire transcription or for a portion of the transcription. Further, within the act 503, the caption engine initializes the values of several parameters that track the progress of the caption engine in allocating elements to caption frames. In one example, the caption engine assigns the next element in the ordered list of elements to the topOITree parameter, assigns a value of 0 to the chars_so_far parameter, and assigns a value of 0 to a duration_so_far parameter. It is to be appreciated that the next element assigned to the topOITree parameter may be the first element where the act 503 has not previously been executed within this instance of the framing process 500.

In act 504, the caption engine reads a next element to be included in a caption frame (e.g., the topOITree parameter). In at least one embodiment, the element corresponds to parse information corresponding to a sentence included in transcription information.

In act 506, the caption engine assembles a next set of sub-elements from the element using the element and the criteria read in act 502. According to one embodiment, in the act 506, the caption engine executes a sequence of instructions compiled from source code similar to the following recursive pseudo code, which references the parseElement structure described above:

```
collectParseTokens(parseElement topOfTree, chars_so_far,
duration_so_far)
    n_chars = topOfTree.string_length;
    total_chars = chars_so_far+n_chars; //already includes spaces
    duration = topOfTree.end_time - topOfTree.begin_time;
    if ((topOfTree.parse_level > MAX_PARSE_LEVEL)    ||
       (((duration_so_far+duration)/total_chars) <
       MIN_DURATION_PER_CHAR)){
       return NULL;
    }
    if (total_chars <= MAX_CAPTION_LENGTH) {
       // we are short enough, so return
          return topOfTree
    }
    else {
       // we are too long, so we must descend into the tree to collect
       // shorter sequences
       elements = [ ]
       parseElement *E = topOfTree->nextLevel
       while (E != NULL) {
          F = collectParseTokens(E, chars_so_far, duration_so_far)
          if (F == NULL) {
             return elements     //no more conforming elements of add
          }
          elements.concat F    //add this series of elements to a caption
          E = E->nextElement
          chars_so_far = elements.total_length_of_strings +
          elements.length
    //add spaces
          duration_so_far = elements.total_duration
       } // for each parseElement
       return elements
    } // else
} // if
}
```

Within this pseudo code example, MAX_CAPTION_LENGTH specifies a maximum length for a caption, MAX_PARSE_LEVEL specifies a maximum level within the parse tree for tokens, and MIN_DURATION_PER_CHAR specifies a minimum display duration per character.

In some embodiments, in executing the act 506, the caption engine uses criteria specifying that caption frames may not end at elements (or sub-elements) storing with one or more POS tags or possessing other predetermined characteristics that cause the element to be deemed inseparable from one or more subsequent elements (or sub-elements). For example, the caption engine use criteria specifying that caption frames may not end at an article, a preposition, a possessive noun, a nouns within a compound proper noun, or a leading part of title or an annotation. In other embodiments, the caption engine may apply rules to preferably break caption frames after particular punctuation marks (e.g., period, semi-colon, hyphen, comma, etc.) or after other annotations.

In act 508, the caption engine determines whether any of the sub-elements of the element met the criteria. In one embodiment, the caption engine makes this determination by determining whether the next set of sub-elements includes no sub-elements. If so, the caption engine executes act 510. Otherwise, the caption engine executes act 512.

In the act 510, the caption engine determines whether it is configured to temporarily relax the criteria in situations where none of the sub-elements of the element meet the criteria (e.g., the next set of sub-elements includes no sub-elements). If so, the caption engine relaxes the criteria in accord with its configuration and executes the act 506. For example, in one embodiment, where the next set of sub-elements is null, the caption engine temporarily increases the maximum parse tree level by 1. In other embodiments, the caption engine temporarily increases the maximum caption length or other criterion included in the criteria.

In the act 512, the caption engine appends the next set of sub-elements to an element sequence. In act 514, the caption engine determines whether the element sequence is ready for framing. In some embodiments, the caption engine determines the element sequence is ready for framing by determining that the element sequence includes information (e.g., elements or sub-elements) other than the element. If not, the caption engine assigns the next element in the ordered list of elements to the topOITree parameter in act 515. Also, in the act 515, the caption engine assigns the total string length of the elements in the element sequence to the chars_so_far parameter and assigns the total duration in the element sequence to the duration_so_far parameter. If the element sequence is ready for framing, the caption engine stores the element sequence in the next caption frame in act 516.

In act 517, the caption engine determines whether the caption frame includes the element (i.e., all sub-elements of the element). If not, the caption engine assigns a value of 0 to the chars_so_far parameter and assigns a value of 0 to a duration_so_far parameter in the act 518 and executes the act 506 to attempt to assemble a new caption frame that includes the subelements of the element that are not included in the caption frame. Otherwise, in act 519, the caption engine determines whether more elements are available for framing. If so, the caption engine executes the act 503 to attempt to frame the next element. Otherwise, the caption engine optionally creates caption information by executing act 520 or terminates the framing process 500.

In the act 520, caption information is produced from the caption frames. In some embodiments, the caption engine iterates through the caption frames, and for each caption, extracts the text from each element in the caption frame and adds a space between the text extracted from each element. Also, in these embodiments, the caption engine inserts line breaks in the text where, for example, the length of the text exceeds a maximum length specified by a MAXIMUM_LINE_LENGTH parameter. In some embodiments, line breaks are inserted between elements in the text such that the difference in line-lengths in captions with multiple lines is reduced. Further, in at least one embodiment, the caption engine extracts the begin time from the first element in the caption frame and the end time from the last element in the caption frame.

In some embodiments, as part of the act 520, the caption engine adjusts the begin time and the end time of one or more caption frames based on the elements included in caption frames adjacent to the one or more caption frames. In these embodiments, the caption engine determines whether underutilized space exists within an adjacent caption frame by identifying empty strings, [SILENCE] annotations or other indications of media file portions not associated with transcription information generated from affirmative communications recorded within the media file. Next, the caption engine may determine whether the caption system is configured to display indications of underutilized space. If not, the caption engine may shift the begin time or the end time of a caption frame to span the underutilized space identified within the adjacent caption frames. Next, within the act 520, the caption engine stores the caption information and terminates the framing process 500.

In some embodiments, as part of the act 506, if the parser is unable to successfully parse the transcription information, the caption engine assembles each set of sub-elements by applying the maximum caption length and minimum display duration per word or character criteria to tokens included in the transcription information. In such embodiments, the element sequence would be stored as a sequence of transcription tokens, with no POS or hierarchical tree structure information. These embodiments may be implemented with the above parseElement data structure by setting the level, part_of_speech_tag, nextElement and nextLevel fields to NULL.

While the framing process 500 described above walks the parse tree to identify elements to include in element sequences, other embodiments of the framing process 500 iterate through elements stored in a flat, linear data structure, such as a linked list. In these embodiments, each element includes a word and a POS tag associated with the word. Further, according to these embodiments, the framing process 500 applies rules to not break caption frames at certain words based on the POS tag associated with the word. For example, the framing process 500 may apply rules to not break captions between an article and the noun introduced by the article, a preposition and the object of the preposition, a possessive noun and the object possessed, nouns within a compound proper noun, and parts of title. In other embodiments, the framing process 500 may apply rules to preferably break caption frames after particular punctuation marks (e.g., periods, semi-colons, hyphens, commas, etc.).

In one example, during execution of the framing process 500, the caption engine invokes the CollectParseTokens function with the topOITree parameter set to the first element in the ordered list of elements, the chars_so_far parameter set to 0 and the duration_so_far parameter set to 0. The return value from this invocation would be an ordered list of parseElements that can be placed in the current caption frame, as described above. Subsequently, the caption engine invokes the CollectParseTokens function with the topOITree parameter set to either another element of the ordered list of elements or to a sub-element of a previous element, in the case where the previous caption frame was completed before the previous element had been completely processed. In the former instance (where the topOITree parameter was set to a new element), the parameters chars_so_far and duration_so_far would be set appropriately based on the current contents of the current caption frame. In the latter instance (where the topOITree parameter is set to a sub-element of the current element), a new caption frame would be allocated and the parameters chars_so_far and duration_so_far would be reset to 0.

Processes in accord with the framing process 500 enable caption systems to intelligently parse transcriptions so that grammatical structures included within transcription information are preserved within captions. This preservation of grammatical structures increases readability of these captions over other captions that contain only a part of a phrase due to a break in the caption frame. Such frames are more difficult for the viewer to follow because it requires more effort to retain all the relevant information.

Figure 6:
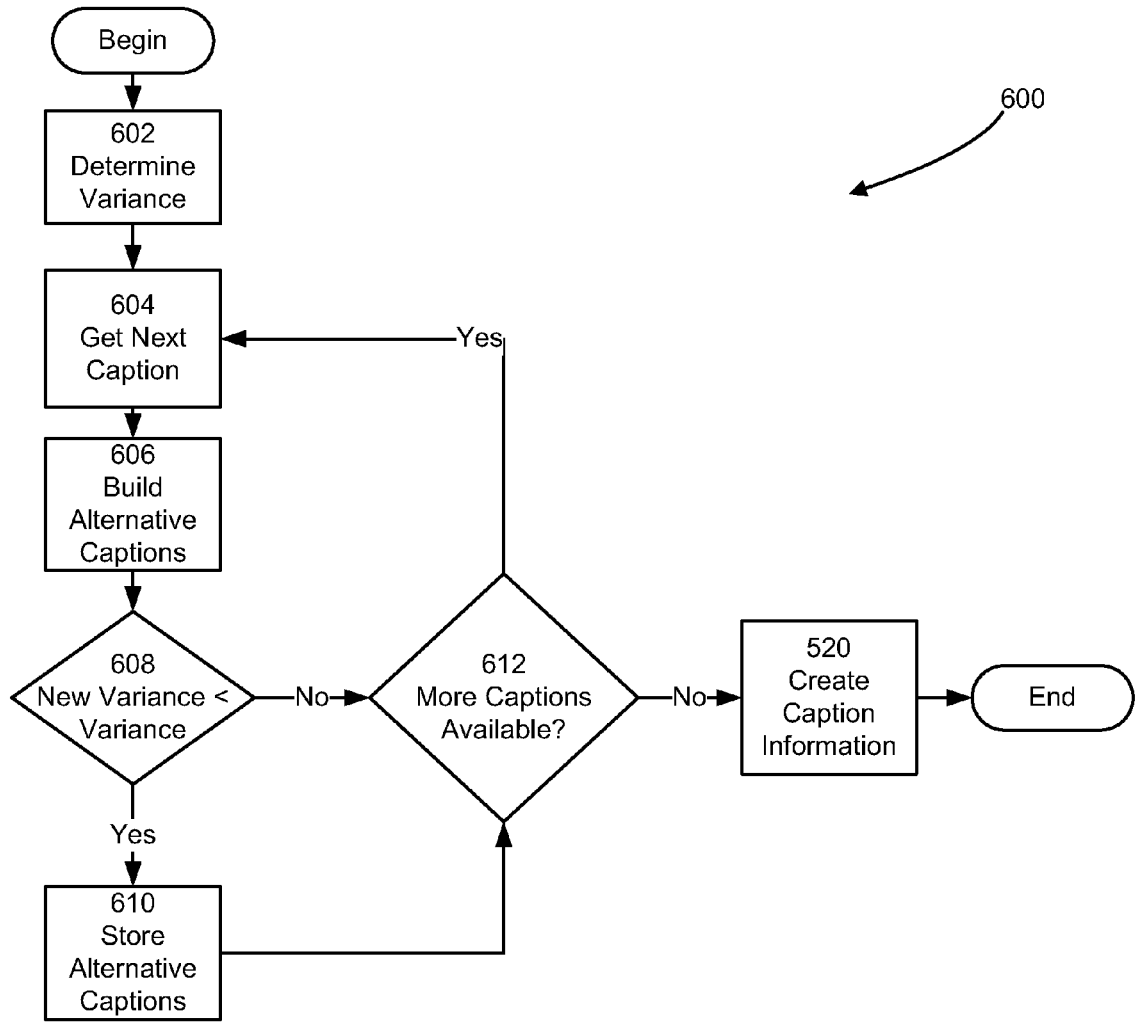
FIG. 6 is a flow diagram illustrating a process for balancing captions.

As discussed above with reference to FIGS. 1 and 4, in some embodiments processes that automatically balance characters or words across a sequence of caption frames are performed using a caption system, such as the caption system 100 described above with reference to FIG. 1. An example of one of these balancing processes is illustrated by FIG. 6. According to this example, the balancing process 600 includes several acts that are described further below.

In act 602, a caption engine, such as the caption engine 132 described above with reference to FIG. 1, determines a value for the variance of a target characteristic of a sequence of caption frames. Examples of target characteristics include words per caption frame, characters per caption frame, and distance of the length of text included in each caption frame from a target length, such as MAX_CAPTION_LENGTH. In some embodiments, the number of caption frames included in the sequence of caption frames is a configurable parameter that is kept to a limited number (i.e., 2 or more) to allow for expedited execution of the balancing process 600. Expedited execution of the process 600 may be particularly useful when the caption system is generating captions in near real-time for streaming media. In these situations, the number of caption frames included in the sequence may be determined as a function of the acceptable delay in producing caption information.

In act 604, the caption engine identifies sub-elements of the elements that are associated with the next caption frame from the set of caption frames. In act 606, the caption engine builds one or more alternatives to the next caption frame and one or more neighboring caption frames using the identified element sequence and element sequences associated with the neighboring caption frames. In one embodiment, a caption frame neighbors another where the caption frames are adjacent to one another within caption information. In another embodiment, the caption engine creates four sets of alternative frames by (1) moving one or more left most elements (or sub-elements where moving the element would violate a criterion and moving the sub-elements would not) from the next caption frame to a caption frame neighboring the next caption frame on the right: (2) moving one or more right most elements (or sub-elements where moving the element would violate a criterion and moving the sub-elements would not) from the next caption frame to a caption frame neighboring the next caption frame on the left; (3) moving one or more right most elements (or sub-elements where moving the element would violate a criterion and moving the sub-elements would not) from a caption frame neighboring the next caption on the left to the next caption frame; and (4) moving one or more left most elements (or sub-elements where moving the element would violate a criterion and moving the sub-elements would not) from a caption frame neighboring the next caption on the right to the next caption frame. In act 608, the caption engine calculates a new value for the variance of the target characteristic assuming that the alternative caption frames are adopted and determines whether the new value is less than the value calculated in the act 602. If so, the caption engine stores the alternative caption frames in act 610. Otherwise, the caption engine determines whether more unprocessed caption frames are available within the set of caption frames in act 612. If so, the caption engine executes the act 604. Otherwise, the caption engine executes a process in accord with the act 520 described above with reference to FIG. 5 and terminates the balancing process 600.

In some embodiments, in executing the act 606, the caption engine applies rules to not break caption frames at elements (or sub-elements) associated with one or more POS tags. For example, the caption engine may apply rules to not break caption frames between an article and the noun introduced by the article, a preposition and the object of the preposition, a possessive noun and the object of the possessive noun, nouns within a compound proper noun, and parts of title or an annotation. In other embodiments, the caption engine may apply rules to preferably break caption frames after particular punctuation marks (e.g., period, semi-colon, hyphen, comma, etc.) or after other annotations.

Processes in accord with the balancing process 600 enable caption systems to intelligently parse transcriptions so that information is presented more evenly over a series of captions. An approximate balance in the number of words that appear in successive frames is important for both aesthetic and cognitive processing reasons.

In some embodiments, the processes 500 and 600 are modified to balance text displayed in captions on a per line basis. In at least one of these embodiments, during execution of the processes 500 and 600, the caption engine uses a maximum caption length that equals the maximum caption length divided by a number of lines displayed within a single caption (e.g., 2). Further, in this embodiment during execution of the act 520, the caption engine constructs caption information for a single caption by aggregating a number of caption frames equal to the number of lines displayed within a single caption.

In other embodiments, the processes 500 and 600 are utilized to generate captions in near real-time from streaming media. In these embodiments, the caption engine executes the framing process 500 at sentence boundaries and may not execute the storage action described within the act 520. Further, in these embodiments, the balancing process 600 includes a limited number of caption frames within its balancing window. The number of caption frames included may be determined based on the acceptable latency between receipt of the media and generation of caption information.

Figure 7:
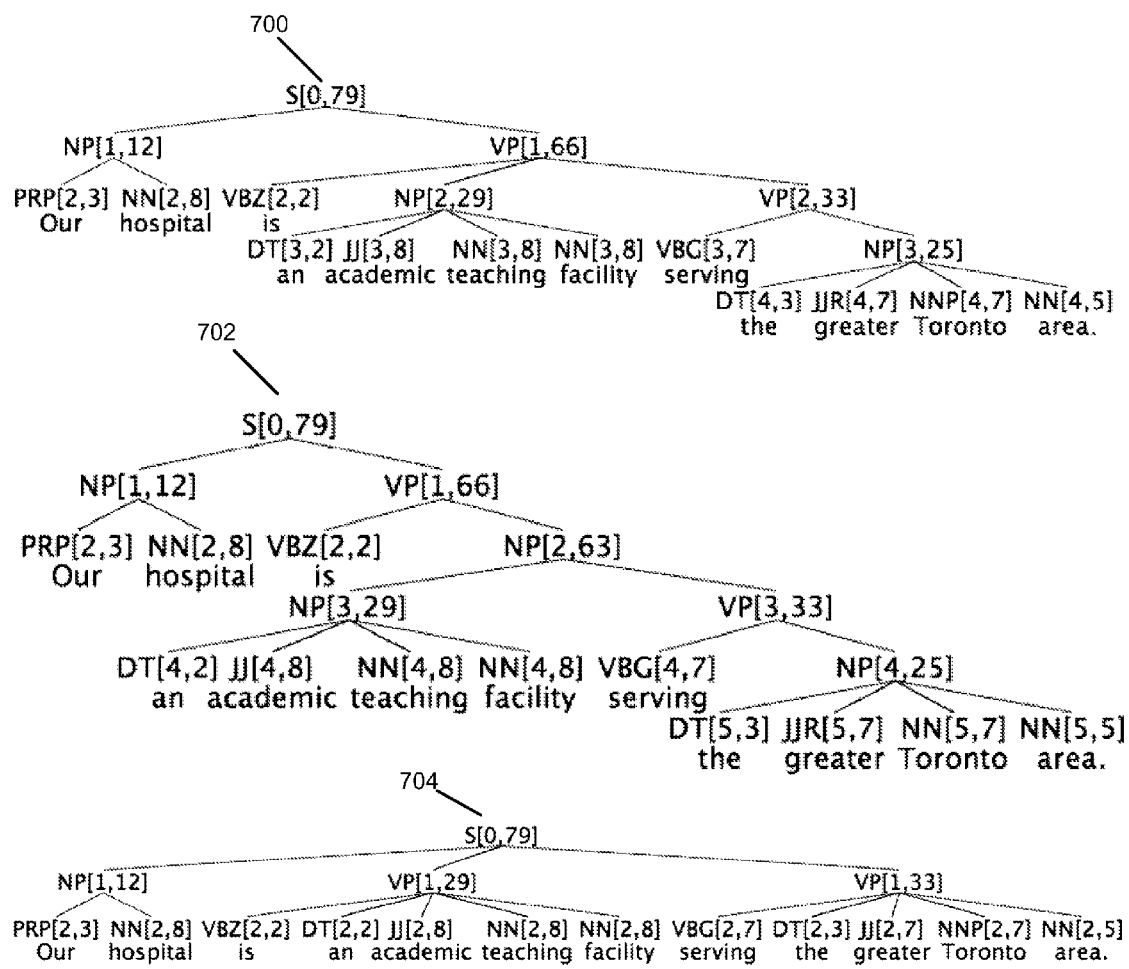
FIG. 7 is an illustration of three parse trees for a sentence processed by a parser.
Figure 8:
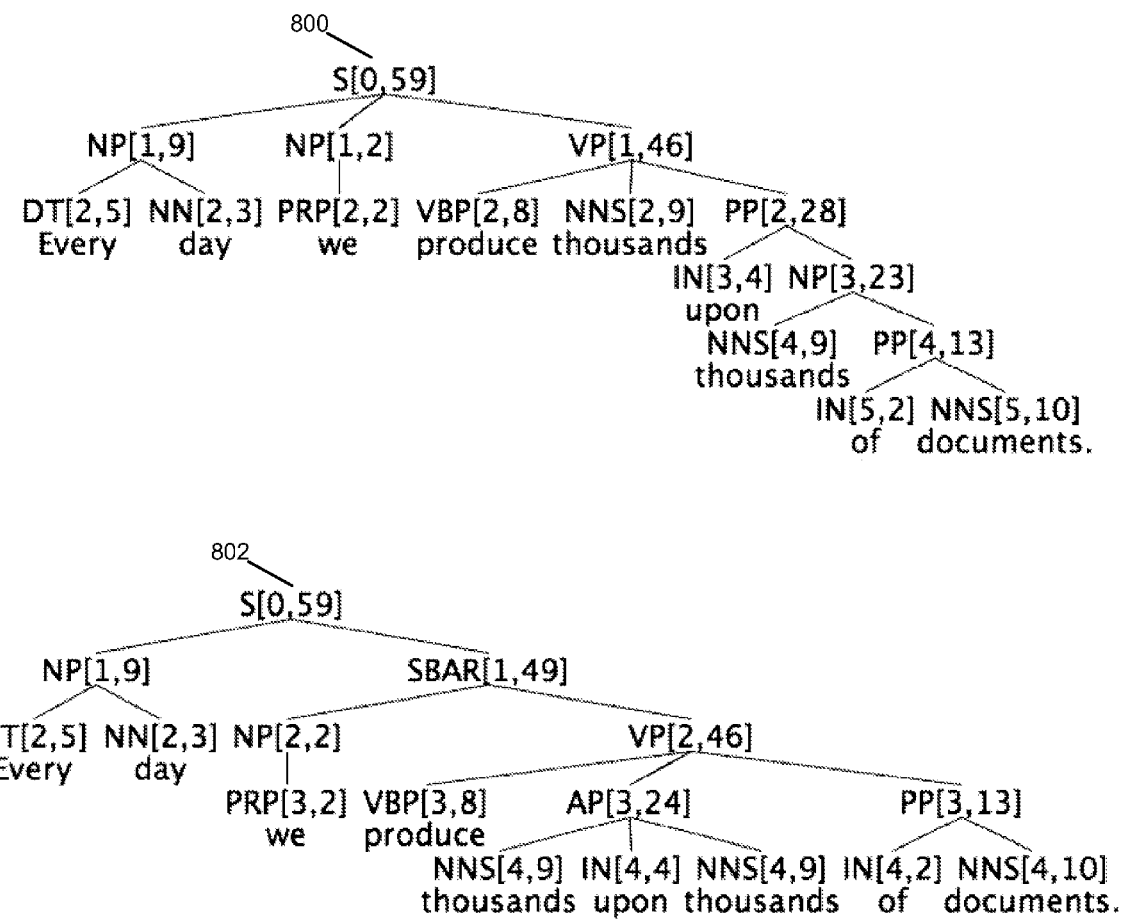
FIG. 8 is an illustration of two parse trees of a sentence processed by a parser.

FIGS. 7 and 8 may be used to illustrate the operation of a caption engine, such as the caption engine 132 described above with reference to FIG. 1. FIG. 7 illustrates three parse trees 700, 702, and 704 created for the sentence, "Our hospital is an academic teaching facility serving the greater Toronto area." FIG. 8 illustrates two parse trees 800 and 802 created for the sentence, "Every day we produce thousand upon thousands of documents." Each node of each parse tree illustrates a POS tag associated with an element and a 2-ple indicating the parseLevel and the stringLength of the text (not including boundary spaces) stored within the element.

According to one example, a caption engine, such as the caption engine 132 described above with reference to FIG. 1, executes a framing process, such as the framing process 500 described above with reference to FIG. 5, on transcription information including the sentences diagrammed in FIGS. 7 and 8. In this example, the caption engine reads criteria that specify a maximum caption frame length of 60 characters, a maximum parse level of 2, and no phrase-internal leaves at or above level 2. Next, the caption engine initializes a data structure to hold an element sequence and reads tokens from the transcription information that represent the sentence, "Every day we produce thousand upon thousands of documents."

The caption engine next assembles a new series of tokens from the parse tree 700 that meet the criteria for a caption frame. In this example, the first token series that meets these criteria includes the tokens: NP[1,12], VBZ[2,2], NP[2,29]. Next, the caption engine appends this token sequence to its element sequence. Then the caption engine determines that the token series does not represent the entire sentence. "Every day we produce thousand upon thousands of documents." Responsive to this determination, the caption engine stores the element sequence in the next caption frame, C1. Then the caption engine determines that more tokens are available (i.e., VP[2,33]), re-initializes the element sequence data structure and assembles a new series of tokens including VP[2,33], which is ultimately stored in the next caption frame, C2.

Next, the caption engine reads tokens from the transcription information that represent the sentence, "Our hospital is an academic teaching facility serving the greater Toronto area." The caption engine next assembles a new series of tokens from the parse tree 800 that meet the criteria for a caption frame. In this example, the first token series that meets these criteria includes the token S[0,59]. Next, the caption engine appends this token sequence to its element sequence. Then the caption engine determines that the token series represents the entire sentence, "Our hospital is an academic teaching facility serving the greater Toronto area." Responsive to this determination, the caption engine determines that no more tokens are available for processing and stores the element sequence in the next caption frame, C3.

At this point in this example, the caption engine has produced captions C1, C2, and C3. Next, according to this example, a caption engine executes a balancing process, such as the framing process 600 described above with reference to FIG. 6, using C1, C2, and C3.

As a first act within the balancing process, the caption engine determines the variance in the number of characters between C1, C2, and C3, which equals 172. Next, the caption engine identifies C1 as the next caption frame to be processed. After identifying C1, the caption engine determines that an alternative C2 cannot be produced by moving NP[2,29] from C1 to C2. After making this determination, the caption engine identifies C2 as the next caption frame to be processed. After identifying C1, the caption engine determines that an alternative to C1 cannot be produced by moving VP[2,33] into C1. However, the caption engine determines that an alternative C2 can be produced by moving NP[1,9], which is a sub-element of S[0,59] as stored in C3, into C2. Next, the caption engine determines the variance in the number of characters between C1, alternative C2, and alternative C3, which equals 19. The caption engine next determines that the new variance is less than the old variance. Responsive to making this determination, the caption engine stores alternative C2 as C2 and alternative C3 as C3. Next, the caption engine determines that unprocessed captions exist (i.e. C3). The caption engine next determines that an alternative C3 cannot be produced by moving VP[2,33] from C2 to C3. The caption engine next determines that there is no change in the variance of C1, C2, and C3, that no more captions are available, and ends the balancing process.

In some embodiments, the processes 500 and 600 described above are performed using alternative parse information, such as the alternative parse information illustrated by the parse trees 702, 704, and 802. In these embodiments, the caption system may utilize additional balancing criteria to determine caption information. For example, in one embodiment the caption system calculates, for each set of alternative parse information, a summary that characterizes the level of the nodes associated with the sub-elements appended to element sequences in the act 512. Examples of such summaries include an average level across all captions, an average level across all captions weighted by the length of the text within the captions, a median level across all captions, etc. According to these embodiments, the caption system provides caption information generated from the parse information that results in the lowest summary. Also, in these embodiments, the order in which the alternative parses are considered may be determined by a score, such as a score returned along with the parse tree in a statistical parser. In these embodiments, a score threshold may be set such that parses which do not exceed the threshold are not considered. In this way, more reliable grammatical groupings may be used to seed the framing process 500.

In another embodiment, the caption system calculates, for each set of alternative parse information, a value for the variance of the target characteristic within the population of captions generated by the processes 500 and 600. According to this embodiment, the caption system provides caption information generated from the parse information that results in the lowest variance.

Figure 9:
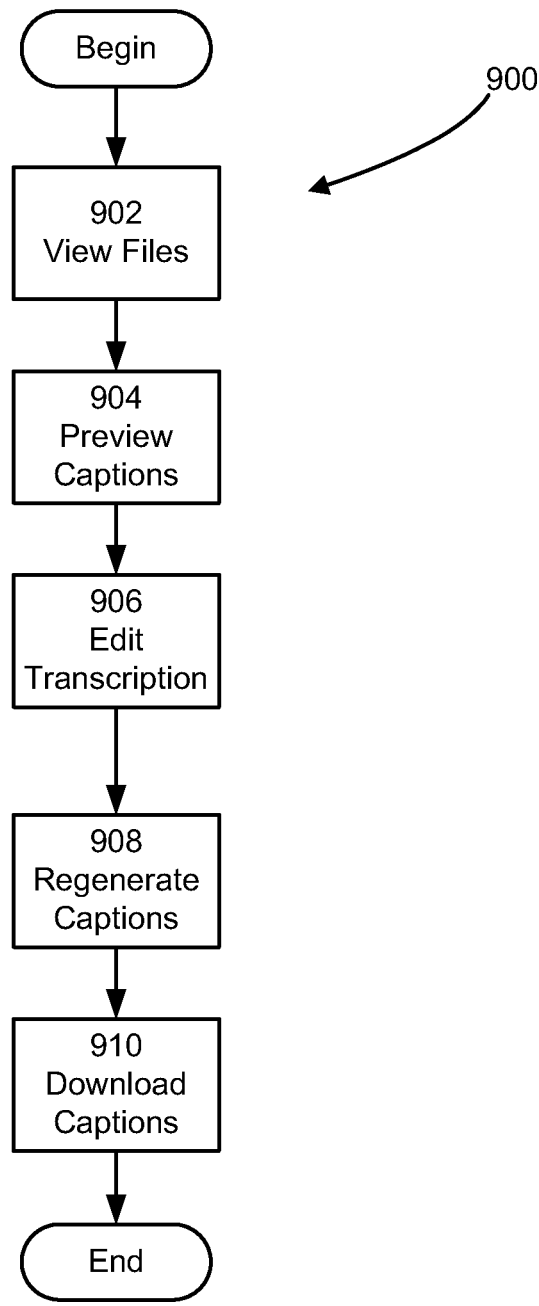
FIG. 9 is a flow diagram illustrating a user process of creating captions.

As discussed above with reference to FIG. 1, in some embodiments processes that enable a customer to create captions are performed using a caption system, such as the caption system 100 described above with reference to FIG. 1. An example of one of these caption creation processes is illustrated by FIG. 9. According to this example, the caption creation process 900 includes several acts that are described further below.

In act 902, a customer interface, such as the customer interface 124 described above with reference to FIG. 1, presents a user interface screen that provides media file, transcription, and caption information to a customer, such as the customer 110 describe above with reference to FIG. 1, via a client computer, such as the client computer 104 described above with reference to FIG. 1. FIG. 10 illustrates one example of a user interface screen presented as part of the act 902. Next, as part of the act 902, the customer interface receives an indication from the user interface that the "Publish" tab has been actuated. Responsive to receiving the indication that the "Publish" tab has been actuated, the customer interface presents a user interface screen that provides publication options. FIG. 11 illustrates one example of a user interface screen presented as part of the act 902. Next, as part of the act 902, the customer interface receives an indication from the user interface that the "Preview Captions" link has been actuated.

Figure 12:
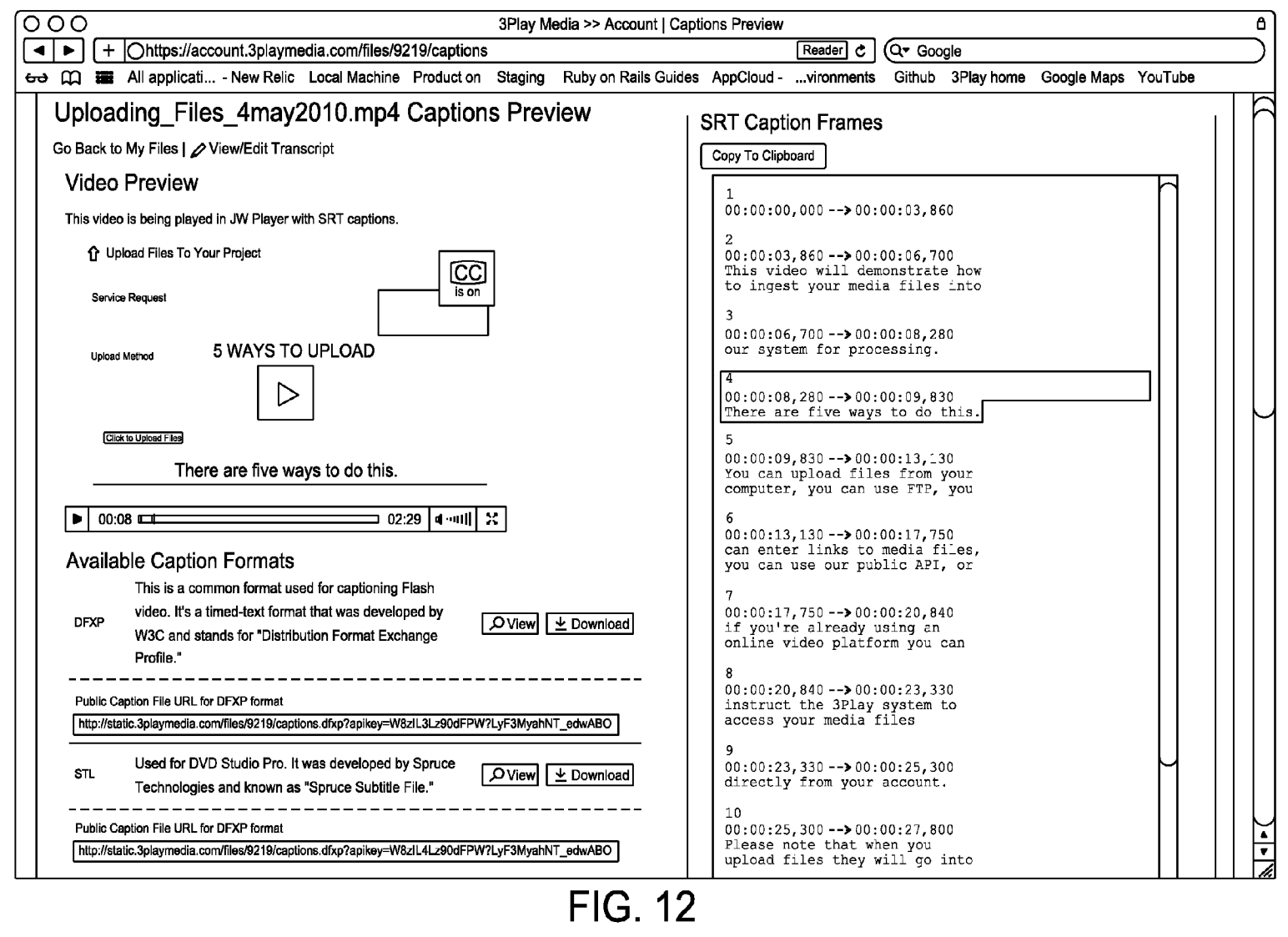

In act 904, responsive to receiving the indication that the "Preview Captions" link has been actuated, the customer interface requests execution of the acts 406-410 and presents a user interface screen that provides available caption formats and previews of the media file in association with captions. FIG. 12 illustrates one example of a user interface screen presented as part of the act 904. Next, as part of the act 904, the customer interface receives an indication from the user interface that the "Go Back to My Files" link has been actuated. Responsive to receiving the indication that the "Go Back to My Files" link has been actuated, the customer interface presents a user interface screen such as the user interface screen illustrated in FIG. 10. Next, the customer interface receives an indication from the user interface that the "View/Edit" link for a particular file has been actuated.

Figure 13:
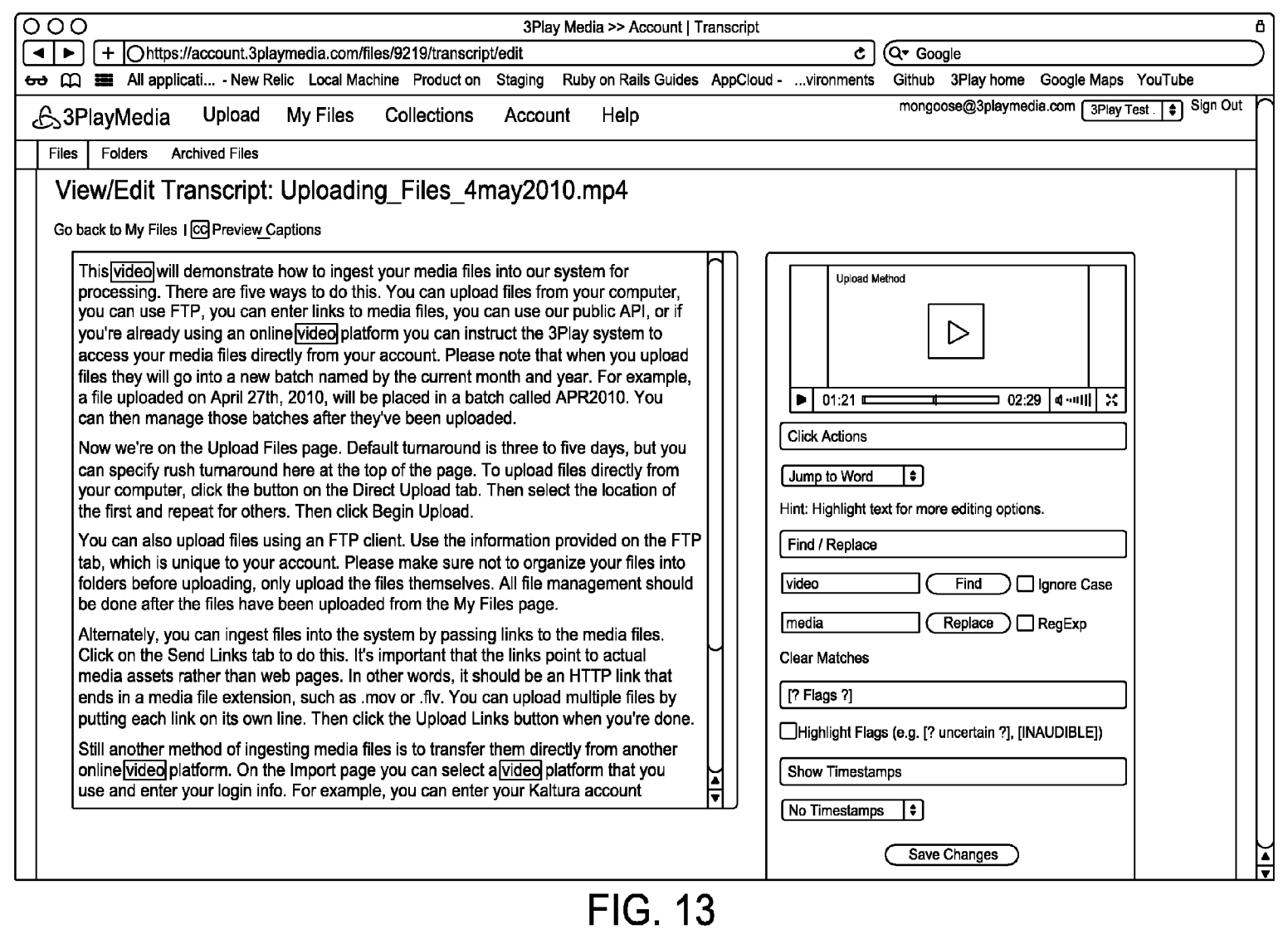
Figure 14:
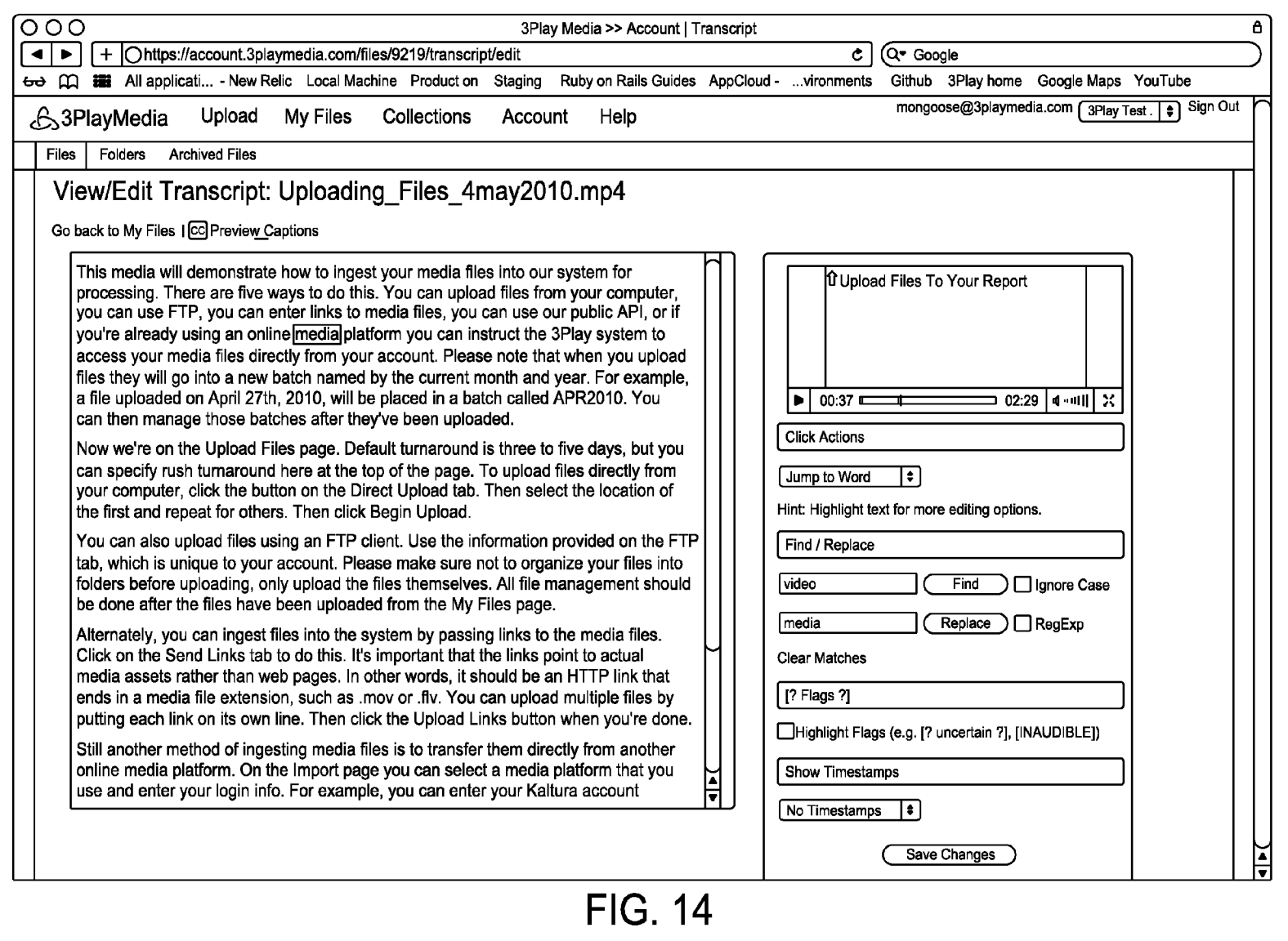

In act 906, responsive to receiving the indication that the "View/Edit" link has been actuated, the customer interface presents a user interface screen through which the customer interface receives edits to transcription information. FIG. 13 illustrates one example of a user interface screen presented as part of the act 906. Next, as part of the act 906, the customer interface receives an indication from the user interface that the word "video" should be replaced with the word "media" in the transcription information. Responsive to receiving this indication, the customer interface performs the replacement and displays a screen in accord with FIG. 14. Next, the customer interface receives an indication from the user interface that the "Save Changes" button has been actuated. Responsive to receiving this indication, the customer interface saves the changes to the transcription information that will be used as input to the caption engine. Next, the customer interface receives an indication from the user interface that the "Go Back to My Files" link has been actuated. Responsive to receiving the indication that the "Go Back to My Files" link has been actuated, the customer interface presents a user interface screen such as the user interface screen illustrated in FIG. 10.

Next, as part of the act 906, the customer interface receives an indication from the user interface that the "Publish" tab has been actuated. Responsive to receiving the indication that the "Publish" tab has been actuated, the customer interface presents a user interface screen in accord with FIG. 11. Next, the customer interface receives an indication from the user interface that the "Preview Captions" link has been actuated.

Figure 15:
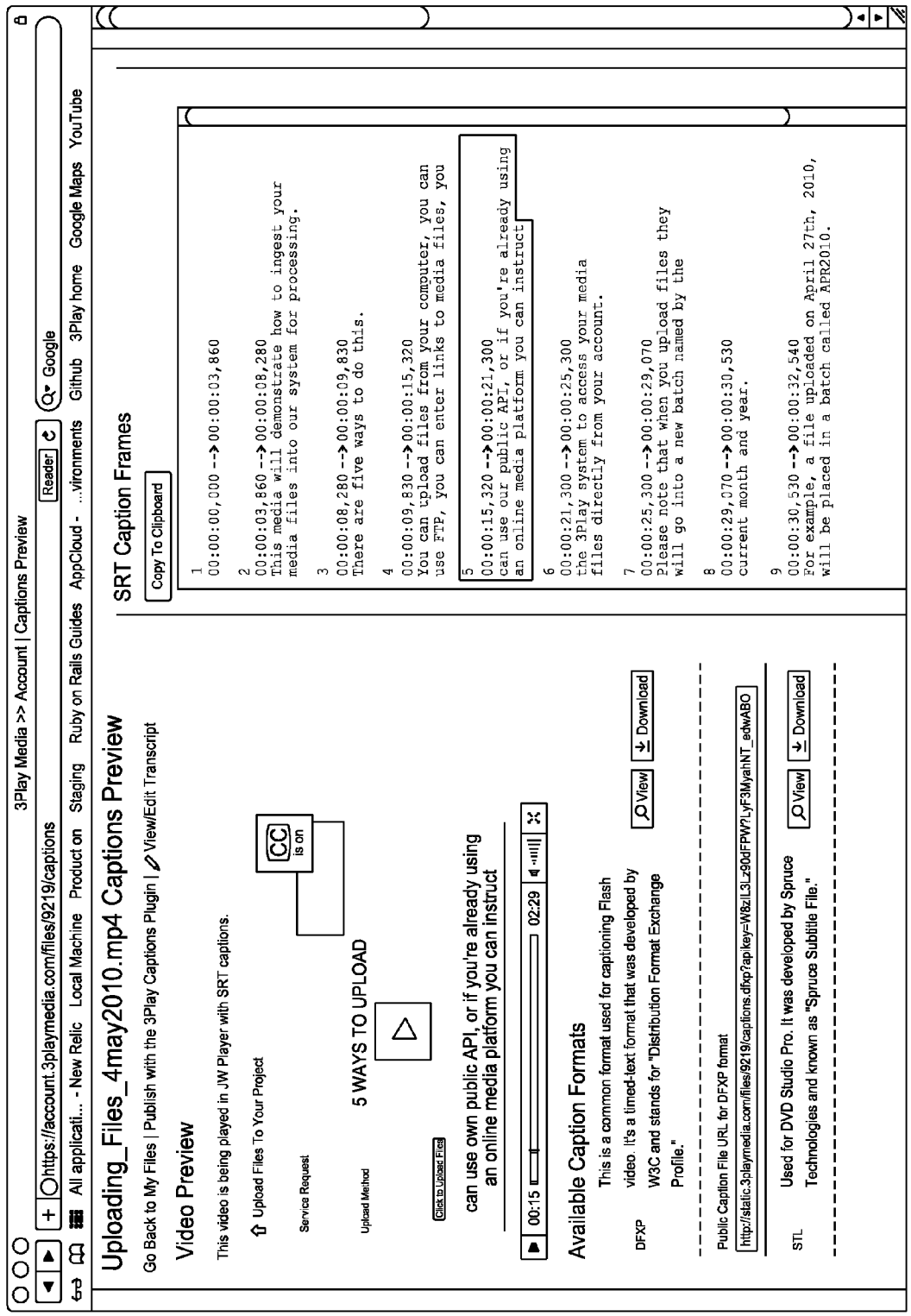
FIG. 15 is an illustration of another user interface screen provided by a caption system.

In act 908, responsive to receiving the indication that "Preview Captions" link has been actuated, the customer interface requests that the caption engine regenerate captions reflecting the previous made edits (e.g., requests execution of the acts 406-410) and provides a user interface screen that presents regenerated captions. FIG. 15 illustrates one example of a user interface screen presented as part of the act 908. Next, the customer interface receives an indication from the user interface that the "Go Back to My Files" link has been actuated. Responsive to receiving the indication that the "Go Back to My Files" link has been actuated, the customer interface presents a user interface screen such as the user interface screen illustrated in FIG. 10. Next, the customer interface receives an indication from the user interface that the "Download" link has been actuated.

Figure 16:
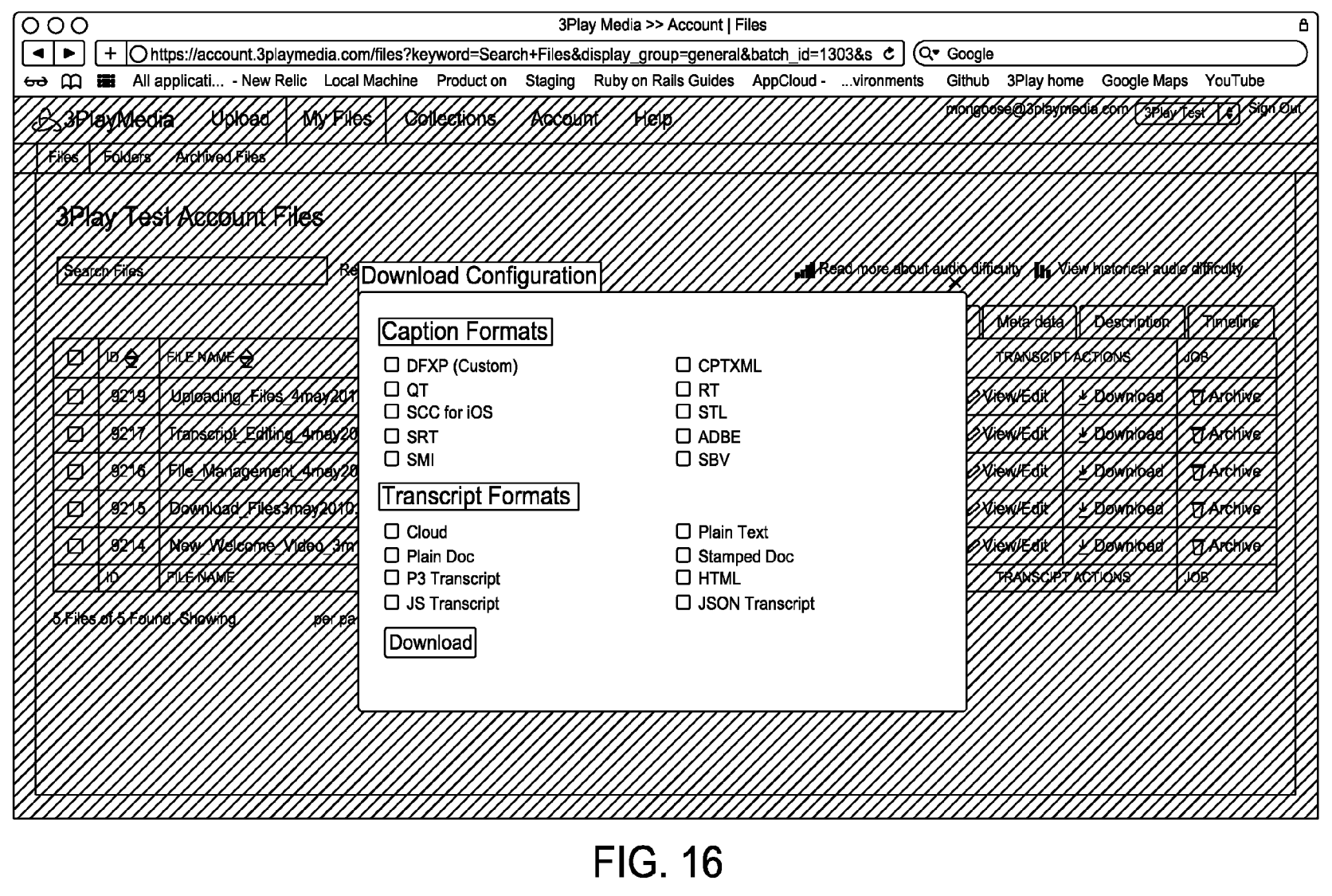

In act 910, responsive to receiving the indication that "Download" link has been actuated, the customer interface provides a user interface screen that presents the caption formats in which the regenerated caption information is available for download. FIG. 16 illustrates one example of a user interface screen presented as part of the act 910. Next, the customer interface receives an indication from the user interface that a format check box and the download button have been actuated. Responsive to receiving this indication, the customer interface downloads the regenerated captions in the selected format to the client computer.

Processes in accord with the caption creation process 900 enable caption systems to provide highly readable caption information for transcription information edited by a customer, without requiring costly and time consuming manual caption generation activities. Moreover, such processes embody an appreciation that customers may also wish to have flexibility in caption formatting, so that they can experiment with these tradeoffs in order to optimize the viewing/listening experience. In addition, applications for automatic regeneration of captions in various formats include modern video players which are becoming increasingly configurable. Each configuration imposes distinct constraints on the caption format. For example, as a user changes the window size of his/her video player, the existing captions may no longer fit on the screen. Or if the user increases the playback speed, the captions may be difficult to read. Processes in accord with the caption creation process 900 provide the flexibility required to accommodate these situations.

Processes 400 through 600 and 900 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a transcription system configured according to the examples and embodiments disclosed herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for generating a plurality of caption frames, the system comprising:
    a memory storing a plurality of elements generated from transcription information;
    at least one processor coupled to the memory; and
    a caption engine component executable by the at least one processor and configured to:
        identify at least one element sequence as meeting predetermined criteria specifying a plurality of caption characteristics, the at least one element sequence including at least one element of the plurality of elements, the at least one element including at least one word from the transcription information;
        store the at least one element sequence within a caption frame of the plurality of caption frames;
        calculate a variance of a characteristic of the plurality of caption frames;
        balance the plurality of caption frames to reduce the variance at least in part by creating an alternative plurality of caption frames by moving the at least one element from the caption frame to a neighboring caption frame, calculating an alternative variance of the characteristic for the alternative plurality of caption frames, identifying that the alternative variance is less than the variance; and storing the alternative plurality of caption frames as the plurality of caption frames; and
        generate caption information including the plurality of caption frames, the caption information including a begin time for the caption frame and an end time for the caption frame.

2. The system according to claim 1, wherein the caption engine component is further configured to:
    identify an element sequence as not meeting the predetermined criteria;
    relax the predetermined criteria to generate relaxed criteria;
    identify the element sequence as meeting the relaxed criteria; and store the element sequence within another caption frame of the plurality of caption frames.

3. The system according to claim 1, wherein the at least one element sequence corresponds to at least one sentence.

4. The system according to claim 1, wherein the predetermined criteria includes a criterion specifying that text included in the at least one element sequence have a length less than a predetermined length.

5. The system according to claim 4, wherein the length includes lengths of annotations included in the text.

6. The system according to claim 1, further comprising a parser component executable by the at least one processor and configured to generate the plurality of elements by executing at least one parse of the transcription information.

7. The system according to claim 6, wherein the predetermined criteria includes a criterion specifying that elements including more complex grammatical structures be identified over elements including less complex grammatical structures.

8. The system according to claim 6, wherein the predetermined criteria includes a criterion specifying that the at least one element sequence end with an element other than an element recorded as inseparable from a subsequent element.

9. The system according to claim 8, wherein the element recorded as inseparable from the subsequent element includes at least one of a predetermined part-of-speech tag, a predetermined punctuation mark, and an annotation.

10. The system according to claim 6, wherein the parser component is configured to structure elements generated by the at least one parse into at least one parse tree.

11. The system according to claim 6, wherein the at least one parse includes a plurality of parses and each parse of the plurality of parses is associated with a score.

12. The system according to claim 1, wherein the transcription information is time-coded.

13. The system according to claim 12, wherein the predetermined criteria includes a criterion specifying that the at least one element sequence have a minimum display duration greater than a predetermined duration.

14. The system according to claim 13, wherein the minimum display duration is measured in at least one of duration per word and duration per character.

15. The system according to claim 13, wherein the caption engine component is further configured to:
identify underutilized space within the caption frame; and
shift at least one of a begin time and an end time of another caption frame adjacent to the caption frame to encompass the underutilized space.

16. The system according to claim 1, wherein the characteristic includes at least one of words per caption frame, characters per caption frame, and difference per caption frame between a length of text included in each caption frame and a target length.

17. A method of generating a plurality of caption frames using a computer system including at least one processor, the method comprising:
identifying, by the at least one processor, at least one element sequence as meeting predetermined criteria specifying a plurality of caption characteristics, the at least one element sequence including at least one element of a plurality of elements generated from transcription information, the at least one element including at least one word from the transcription information;
associating, by the at least one processor, a caption frame of the plurality of caption frames with the at least one element sequence;
calculating, by the at least one processor, a variance of a characteristic of the plurality of caption frames;
balancing, by the at least one processor, the plurality of caption frames to reduce the variance at least in part by creating an alternative plurality of caption frames by moving the at least one element from the caption frame to a neighboring caption frame, calculating an alternative variance of the characteristic for the alternative plurality of caption frames, identifying that the alternative variance is less than the variance; and storing the alternative plurality of caption frames as the plurality of caption frames; and
generating, by the at least one processor, caption information including the plurality of caption frames, the caption information including a begin time for the caption frame and an end time for the caption frame.

18. The method according to claim 17, further comprising executing at least one parse of transcription information to generate the plurality of elements.

19. The method according to claim 18, wherein identifying the at least one element sequence as meeting predetermined criteria includes identifying an element including more complex grammatical structures over an element including less complex grammatical structures.

20. The method according to claim 17, wherein calculating the variance includes calculating a variance of at least one of words per caption frame, characters per caption frame, and difference per caption frame between a length of text included in each caption frame and a target length.

21. A computer readable medium storing a plurality of instructions executable by at least one processor of a computer system to generate a plurality of caption frames, the plurality of instructions including instructions configured to instruct the computer system to:
identify, by the at least one processor, at least one element sequence as meeting predetermined criteria specifying a plurality of caption characteristics, the at least one element sequence including at least one element of a plurality of elements generated from transcription information, the at least one element including at least one word from the transcription information;
associate, by the at least one processor, a caption frame of the plurality of caption frames with the at least one element sequence;
calculate, by the at least one processor, a variance of a characteristic of the plurality of caption frames;
balance, by the at least one processor, the plurality of caption frames to decrease the variance at least in part by creating an alternative plurality of caption frames by moving the at least one element from the caption frame to a neighboring caption frame, calculating an alternative variance of the characteristic for the alternative plurality of caption frames, identifying that the alternative variance is less than the variance; and storing the alternative plurality of caption frames as the plurality of caption frames; and
generate, by the at least one processor, caption information including the plurality of caption frames, the caption information including a begin time for the caption frame and an end time for the caption frame.

22. The computer readable medium according to claim 21, wherein the instructions are further configured to instruct the computer system to execute at least one parse of transcription information to generate the plurality of elements and wherein the instructions to identify the at least one element sequence as meeting predetermined criteria include instructions to identify an element including more complex grammatical structures over an element including less complex grammatical structures.

* * * * *